US012597079B2

(12) United States Patent
Morgan et al.

(10) Patent No.: US 12,597,079 B2
(45) Date of Patent: *Apr. 7, 2026

(54) ASSEMBLING PARAMETERS TO COMPUTE TAXES FOR CROSS-BORDER SALES

(71) Applicant: Avalara, Inc., Seattle, WA (US)

(72) Inventors: Amy E. Morgan, Seattle, WA (US);
Duncan K. Carey, Seattle, WA (US);
Kevin James Hess, Hillsborough, NC
(US); Aaron David Wilson, Kenmore,
WA (US); Mark Wilhelm, Bainbridge
Island, WA (US); Naveen K. Agrawal,
Bellevue, WA (US); **Mark Alan
Withers**, Bainbridge Island, WA (US);
David Kempe, Auburn, WA (US)

(73) Assignee: Avalara, Inc., Seattle, WA (US)

( * ) Notice: Subject to any disclaimer, the term of this
patent is extended or adjusted under 35
U.S.C. 154(b) by 0 days.

This patent is subject to a terminal dis-
claimer.

(21) Appl. No.: 17/489,220

(22) Filed: Sep. 29, 2021

(65) Prior Publication Data

US 2022/0020097 A1    Jan. 20, 2022

Related U.S. Application Data

(63) Continuation of application No. 16/696,062, filed on
Nov. 26, 2019.

(51) Int. Cl.
*G06Q 30/06*          (2023.01)
*G06Q 20/20*          (2012.01)
(Continued)

(52) U.S. Cl.
CPC ......... *G06Q 40/123* (2013.12); *G06Q 20/207*
(2013.01); *G06Q 30/04* (2013.01);
(Continued)

(58) Field of Classification Search
None
See application file for complete search history.

(56) References Cited

U.S. PATENT DOCUMENTS 5,903,881 A      5/1999  Schrader et al.
6,983,261 B1 *   1/2006  Francisco .............. G06Q 20/20
                                                         235/382
(Continued)

OTHER PUBLICATIONS

Azam, R. (2012). Global Taxation of Cross-Border E-Commerce
Income. Virginia Tax Review, 31(4), 639-694. (Globai) (Year:
2012).*

(Continued)

*Primary Examiner* — Chikaodinaka Ojiaku

(74) *Attorney, Agent, or Firm* — Jeremiah J. Baunach;
Frontier IP Law PLLC

(57) ABSTRACT

A system may learn what parameters are required for an item
in order to compute tax for the item based on preliminary
data regarding the item and/or the transaction. The system
may determine a classification code based on such prelimi-
nary data and use that classification code to search or query
a database storing information indicative of parameters
required to compute tax for items having such a classifica-
tion code. The system may map the received preliminary
data into the learned required parameters and determine
whether there are any required parameters for which there
has not been any preliminary data mapped into them. The
system may prompt the customer (e.g., seller of the item) or
other user for data values of such missing required param-
eters or otherwise obtain data values of such parameters in
order to compute the tax for the item.

29 Claims, 27 Drawing Sheets

300

(51) Int. Cl.

| | |
|---|---|
| *G06Q 30/04* | (2012.01) |
| *G06Q 40/02* | (2023.01) |
| *G06Q 40/10* | (2023.01) |
| *G06Q 40/12* | (2023.01) |

(52) U.S. Cl.
CPC ............. *G06Q 30/06* (2013.01); *G06Q 40/02* (2013.01); *G06Q 40/10* (2013.01)

(56) References Cited

U.S. PATENT DOCUMENTS

| | | | |
|---|---|---|---|
| 6,993,502 B1* | 1/2006 | Gryglewicz ......... | G06Q 40/123 705/19 |
| 7,676,407 B2 | 3/2010 | Van et al. | |
| 7,739,160 B1* | 6/2010 | Ryan ..................... | G06Q 40/02 705/31 |
| 7,765,132 B2* | 7/2010 | Wilson .................. | G06Q 40/10 705/18 |
| 7,783,536 B2 | 8/2010 | William et al. | |
| 7,792,863 B2 | 9/2010 | Uy et al. | |
| 7,865,427 B2 | 1/2011 | Wright et al. | |
| 7,873,566 B1 | 1/2011 | Templeton et al. | |
| 7,925,537 B2* | 4/2011 | Ryan, Jr. .............. | G06Q 40/123 705/31 |
| 7,933,803 B1 | 4/2011 | Nadler et al. | |
| 8,620,578 B1 | 12/2013 | Brown et al. | |
| 8,725,407 B2 | 5/2014 | Hurley et al. | |
| 9,760,915 B2* | 9/2017 | Pavlou ................. | G06Q 40/123 |
| 9,830,326 B2* | 11/2017 | Bay ........................ | G06F 16/148 |
| 10,332,216 B2* | 6/2019 | Barsade ............... | G06Q 40/123 |
| 10,445,818 B1 | 10/2019 | Chowdhary | |
| 10,546,278 B2 | 1/2020 | Dreicer et al. | |
| 10,713,596 B2 | 7/2020 | Cozine et al. | |
| 10,769,611 B2* | 9/2020 | McNeel ................ | H04W 4/021 |
| 10,891,535 B1* | 1/2021 | Mancuso ............ | H04L 63/0428 |
| 10,909,591 B2* | 2/2021 | Chase .................. | G06Q 20/207 |
| 2002/0010665 A1* | 1/2002 | Lefebvre ................ | G06Q 99/00 705/31 |
| 2002/0052792 A1 | 5/2002 | Johnson et al. | |
| 2002/0116302 A1 | 8/2002 | Wilmes et al. | |
| 2002/0138765 A1 | 9/2002 | Fishman et al. | |
| 2002/0194123 A1 | 12/2002 | Agee et al. | |
| 2002/0198832 A1 | 12/2002 | Agee et al. | |
| 2003/0055754 A1 | 3/2003 | Sullivan | |
| 2003/0061131 A1 | 3/2003 | Parkan | |
| 2003/0093320 A1* | 5/2003 | Sullivan ............... | G06Q 20/207 705/19 |
| 2003/0101111 A1* | 5/2003 | Dang ..................... | G06Q 40/02 705/31 |
| 2003/0101112 A1* | 5/2003 | Gallagher ............ | G06Q 20/207 705/31 |
| 2003/0167224 A1 | 9/2003 | Periwal | |
| 2004/0002906 A1* | 1/2004 | Von Drehnen ..... | G06Q 30/0641 705/31 |
| 2004/0230525 A1* | 11/2004 | Barsade ................ | G06Q 40/02 705/40 |
| 2005/0240524 A1 | 10/2005 | Van et al. | |
| 2005/0261967 A1* | 11/2005 | Barry ....................... | G07G 1/01 705/16 |
| 2005/0261995 A1* | 11/2005 | Phelan ................. | G06Q 40/123 705/31 |
| 2005/0289027 A1* | 12/2005 | Buarque De Macedo .................. G06Q 40/02 705/31 |
| 2006/0085305 A1* | 4/2006 | Sindambiwe ........ | G06Q 40/123 705/31 |
| 2006/0095521 A1* | 5/2006 | Patinkin ............... | G06Q 10/107 709/206 |
| 2007/0043636 A1* | 2/2007 | Foster ................... | G06Q 40/02 705/31 |
| 2007/0136158 A1* | 6/2007 | Rawlings ............. | G06Q 40/123 705/31 |
| 2007/0136159 A1* | 6/2007 | Rawlings ............... | G06Q 20/14 705/31 |
| 2007/0244777 A1* | 10/2007 | Torre ..................... | G06Q 40/00 705/35 |
| 2007/0250440 A1* | 10/2007 | Paulsen ................ | G06Q 50/188 705/39 |
| 2007/0299733 A1* | 12/2007 | Derby ................... | G06Q 40/02 705/26.1 |
| 2008/0071653 A1* | 3/2008 | Cirulli ................... | G06Q 40/00 705/40 |
| 2008/0294538 A1* | 11/2008 | Barsade ................ | G06Q 40/12 705/40 |
| 2009/0204610 A1* | 8/2009 | Hellstrom .............. | G06F 16/00 707/999.005 |
| 2009/0271282 A1* | 10/2009 | Pool ....................... | G06Q 20/20 705/26.1 |
| 2009/0299916 A1 | 12/2009 | Glinberg et al. | |
| 2010/0293079 A1 | 11/2010 | Wilson et al. | |
| 2010/0306071 A1* | 12/2010 | Kay ........................ | G06Q 40/02 705/19 |
| 2011/0246318 A1* | 10/2011 | Coulter .............. | G06Q 30/0601 705/26.1 |
| 2012/0323749 A1* | 12/2012 | Lapidus ............... | G06Q 40/123 705/31 |
| 2013/0013471 A1* | 1/2013 | Fishman ............... | G06Q 40/00 705/31 |
| 2013/0085913 A1* | 4/2013 | Luongo ................ | G06Q 40/123 705/31 |
| 2014/0379531 A1* | 12/2014 | Huang .................. | G06Q 20/207 705/26.81 |
| 2015/0248657 A1* | 9/2015 | Loock ................ | G06Q 20/4014 705/19 |
| 2016/0026693 A1 | 1/2016 | Dreicer et al. | |
| 2016/0140211 A1 | 5/2016 | Riggs | |
| 2016/0188751 A1* | 6/2016 | Agrawal ........... | G06F 16/90344 707/741 |
| 2016/0364474 A1* | 12/2016 | Bay ........................ | G06F 16/148 |
| 2017/0116682 A1* | 4/2017 | Matsumoto .......... | G06Q 20/207 |
| 2017/0132603 A1* | 5/2017 | McNeel ................ | H04W 4/029 |
| 2017/0242825 A1 | 8/2017 | Riggs et al. | |
| 2018/0053115 A1* | 2/2018 | Vachhani ........... | G06Q 30/0204 |
| 2018/0067811 A1* | 3/2018 | Mowatt .............. | G06F 11/1423 |
| 2018/0189478 A1* | 7/2018 | Richardson ............ | G06F 21/50 |
| 2018/0267847 A1* | 9/2018 | Smith .................. | G06F 16/9577 |
| 2018/0365201 A1* | 12/2018 | Hunn ................... | G06F 40/134 |
| 2019/0228035 A1 | 7/2019 | Riggs | |
| 2019/0370308 A1 | 12/2019 | Riggs et al. | |
| 2019/0392001 A1* | 12/2019 | Carothers ............ | G06N 3/0464 |
| 2020/0153711 A1* | 5/2020 | Chauhan ............. | H04L 41/5096 |
| 2020/0364277 A1* | 11/2020 | Wang .................. | G06F 16/9536 |
| 2021/0142334 A1 | 5/2021 | Webster et al. | |
| 2024/0193608 A1* | 6/2024 | Tholar ................... | G06N 20/00 |
| 2025/0104145 A1* | 3/2025 | Mintz ................... | G06Q 40/06 |

OTHER PUBLICATIONS

H. Hu, Y. Wen, T.-S. Chua and X. Li, "Toward Scalable Systems for Big Data Analytics: A Technology Tutorial," in IEEE Access, vol. 2, pp. 652-687, 2014 (Data Analytics). (Year: 2014).*

N. Makrynioti and V. Vassalos, "Declarative Data Analytics: A Survey," in IEEE Transactions on Knowledge and Data Engineering, vol. 33, No. 6, pp. 2392-2411, Jun. 1, 2021, doi: 10.1109/ TKDE.2019.2958084 (Data) (Year: 2021).*

Data Mining: Concepts, Models, Methods, and Algorithms, Mehmed Kantardzic (Models, Methods and Algorithms).*

W. Yan, H. Shuanggen, P. Jun and P. Fang, "The Tax Issue and Counterplan within Process of the Electronic Commerce Development," 2010 International Conference on E-Business and E-Government, Guangzhou, China, 2010, pp. 417-420 (E-Commerce).*

Financial Transaction Manager Technical Overview, Craig Bryce, Sean Dunne, Prasad Edlabadkar, Peter McGrath, Sandesh Udupa, IBM Redbooks (Financial). (Year: 2014).

Y. Zhang et al., "Parallel Processing Systems for Big Data: A Survey," in Proceedings of the IEEE, vol. 104, No. 11, pp. 2114-2136, Nov. 2016 (Survey) (Year: 2016).

* cited by examiner

200

140 WHOLE TAX-ASSISTING PLATFORM (OPTIONAL)

148 TAX COMPUTATION DATA

129 Response

149 CE API

147 COMPUTATION ENGINE

144 REQUEST DATA (e.g. GetTax) 172

128 Request

120 CUSTOMER INPUTS ENGINE

121 UI

124 PRELIMINARY DATA

127

155 CONFIGURATION

122 Request about item

123 Response

125 Supplemental Request

126 Next Response

127 SUPPLEMENTAL DATA

136 ITEM CLASSIFICATION CODE(S)

172 ITEM CODE 124 136 164 127

171

170 STORED DATA

136

152 MAPPER API

164 REQUIRED PARAMETERS

PR1 ✓
PR2 ✓
PR3 ✓
PR4 ✗

124

DT1 DT2 DT3 DT4 DT5 DT6

150 MAPPER

124

132 CL. API

130 CLASSIFIER

160 CONTENT

136

112 CUSTOMER'S CLIENT DEVICE

114 CONNECTOR

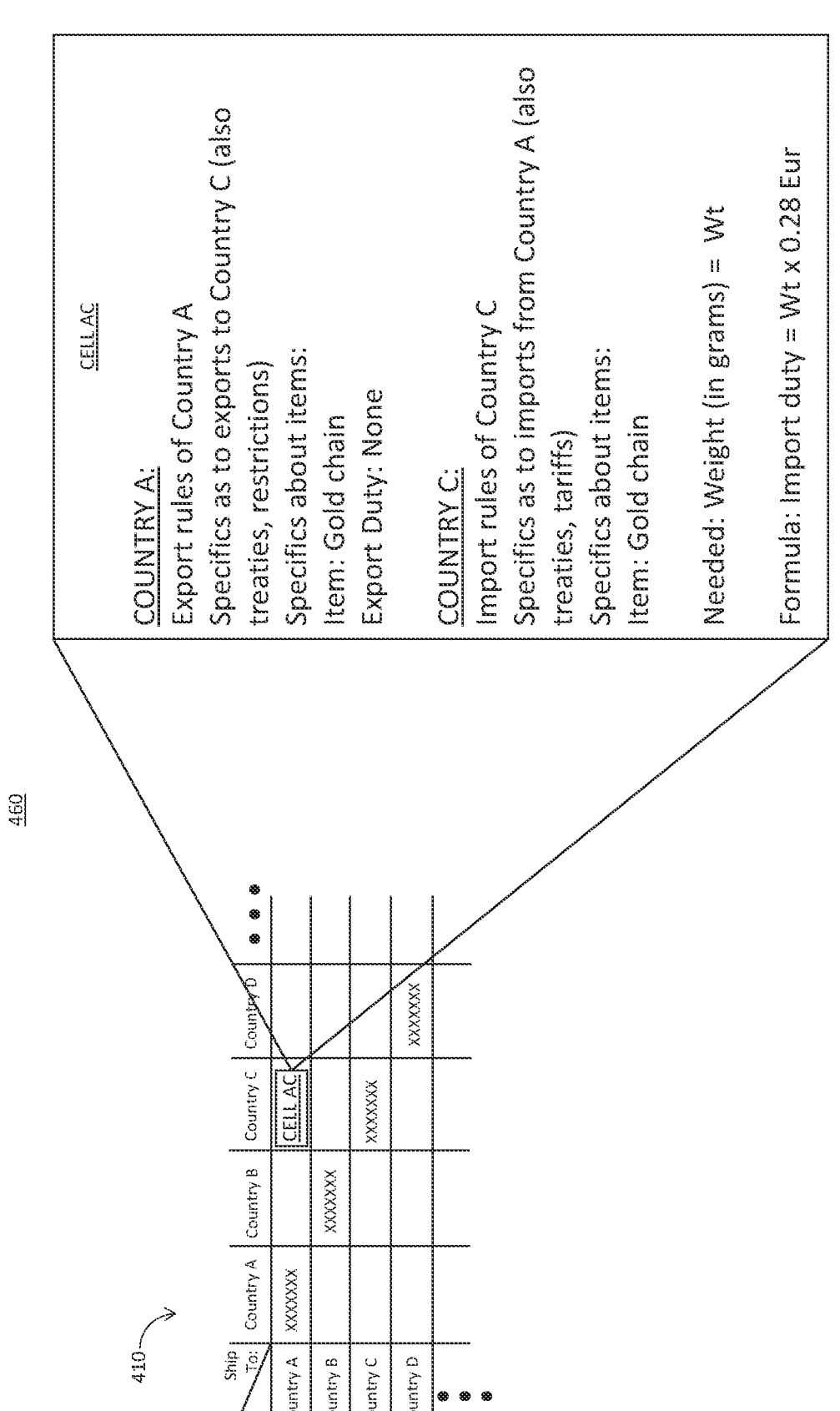

CELL AC

COUNTRY A:
Export rules of Country A
Specifics as to exports to Country C (also treaties, restrictions)
Specifics about items:
Item: Gold chain
Export Duty: None

COUNTRY C:
Import rules of Country C
Specifics as to imports from Country A (also treaties, tariffs)
Specifics about items:
Item: Gold chain Needed: Weight (in grams) = Wt Formula: Import duty = Wt x 0.28 Eur

460

410

| Ship To: / Ship From: | Country A | Country B | Country C | Country D | |
|---|---|---|---|---|---|
| Country A | XXXXXXX | | CELL AC | | |
| Country B | | XXXXXXX | | | |
| Country C | | | XXXXXXX | | |
| Country D | | | | XXXXXXX | |

FIG. 4

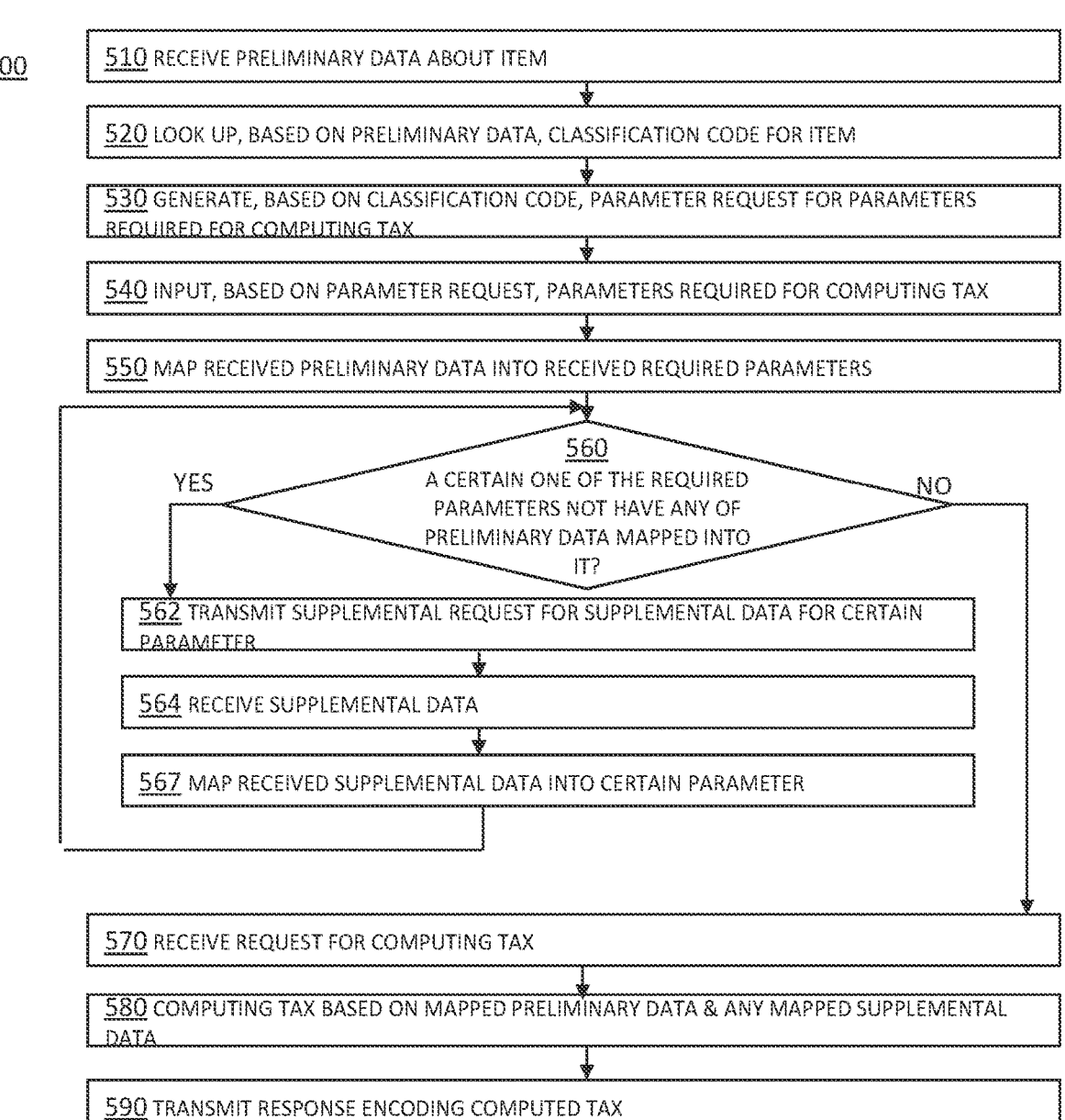

500

510 RECEIVE PRELIMINARY DATA ABOUT ITEM

520 LOOK UP, BASED ON PRELIMINARY DATA, CLASSIFICATION CODE FOR ITEM

530 GENERATE, BASED ON CLASSIFICATION CODE, PARAMETER REQUEST FOR PARAMETERS REQUIRED FOR COMPUTING TAX

540 INPUT, BASED ON PARAMETER REQUEST, PARAMETERS REQUIRED FOR COMPUTING TAX

550 MAP RECEIVED PRELIMINARY DATA INTO RECEIVED REQUIRED PARAMETERS

560 A CERTAIN ONE OF THE REQUIRED PARAMETERS NOT HAVE ANY OF PRELIMINARY DATA MAPPED INTO IT?

YES    NO

562 TRANSMIT SUPPLEMENTAL REQUEST FOR SUPPLEMENTAL DATA FOR CERTAIN PARAMETER

564 RECEIVE SUPPLEMENTAL DATA

567 MAP RECEIVED SUPPLEMENTAL DATA INTO CERTAIN PARAMETER

570 RECEIVE REQUEST FOR COMPUTING TAX

580 COMPUTING TAX BASED ON MAPPED PRELIMINARY DATA & ANY MAPPED SUPPLEMENTAL DATA

590 TRANSMIT RESPONSE ENCODING COMPUTED TAX

FIG. 5

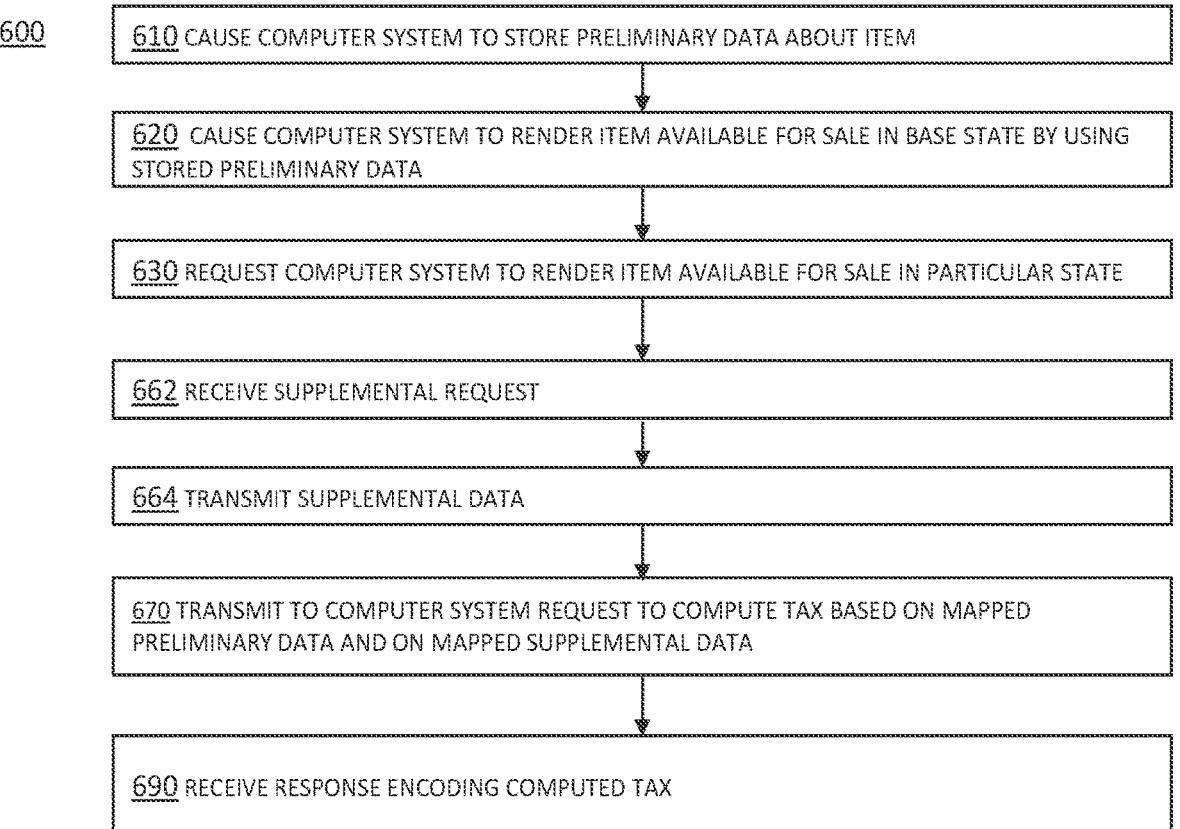

600

610 CAUSE COMPUTER SYSTEM TO STORE PRELIMINARY DATA ABOUT ITEM

620 CAUSE COMPUTER SYSTEM TO RENDER ITEM AVAILABLE FOR SALE IN BASE STATE BY USING STORED PRELIMINARY DATA

630 REQUEST COMPUTER SYSTEM TO RENDER ITEM AVAILABLE FOR SALE IN PARTICULAR STATE

662 RECEIVE SUPPLEMENTAL REQUEST

664 TRANSMIT SUPPLEMENTAL DATA

670 TRANSMIT TO COMPUTER SYSTEM REQUEST TO COMPUTE TAX BASED ON MAPPED PRELIMINARY DATA AND ON MAPPED SUPPLEMENTAL DATA

690 RECEIVE RESPONSE ENCODING COMPUTED TAX

| 112 Customer | 120 Inputs Engine & 150 Mapper | 130 Classifier | 160 Content |

1. Enter item data

2. Create cl. code hints

3. Request Cl. (e.g. HS) code

4. Receive Cl. (e.g. HS) code

5. Request required parameters

6. Receive required parameters

7. Data map into all Parameters?

NO: 8. Request missing data

9. Receive missing data 10. (Within 120) store item code and all parameters

900

Your stored Item:

Category:             | Jewelry |

Item:                  | Chain |

Ship From:          | USA |

914

Ship To:             | France |

916

Main element      | Gold |

Carats                | 14K |

906

| Click to create your Item |

902

Preparing to create your Item

| | |
|---|---|
| Category: | Jewelry |
| Item: | Chain |
| Ship From: | USA |
| Ship To: | France |
| Main element | Gold |
| Carats | 14K |

914     916

908

OOPS! For this we need
910 you to also enter:     912

Weight (in grams):     _____ g

904

Preparing to create your Item

| | |
|---|---|
| Category: | Jewelry |
| Item: | Chain |
| Ship From: | USA |
| Ship To: | France |
| Main element | Gold |
| Carats | 14K |

914

916

912

910

Weight in grams:     50 g

918

Thank you!

Now click to create your Item

1400

```
        ServiceTypeId Description
1402    0 None
        1 AvaTaxST
        2 AvaTaxPro
        3 AvaTaxGlobal
        4 AutoAddress
        5 AutoReturns
        6 TaxSolver
        7 AvaTaxCsp
        8 Twe
        9 Mrs
        10 AvaCert
        11 AuthorizationPartner
        12 CertCapture
        13 AvaUpc
        14 AvaCUT
        15 AvaLandedCost
        16 AvaLodging
        17 AvaBottle
        18 AvaComms
        19 AvaEWaste
        20 AvaExemptTier1
        21 AvaExemptTier2
        22 AvaExemptTier3
        23 AvaExemptTier4
        24 MRSComplianceManager
        25 AvaBikeTax
        26 AvaCheckoutBag
        27 TFOCompliance
        28 SendSalesRateFile
        29 AvaMeals
        30 AvaAlcohol
        31 ARA
        32 ManagedARA
```

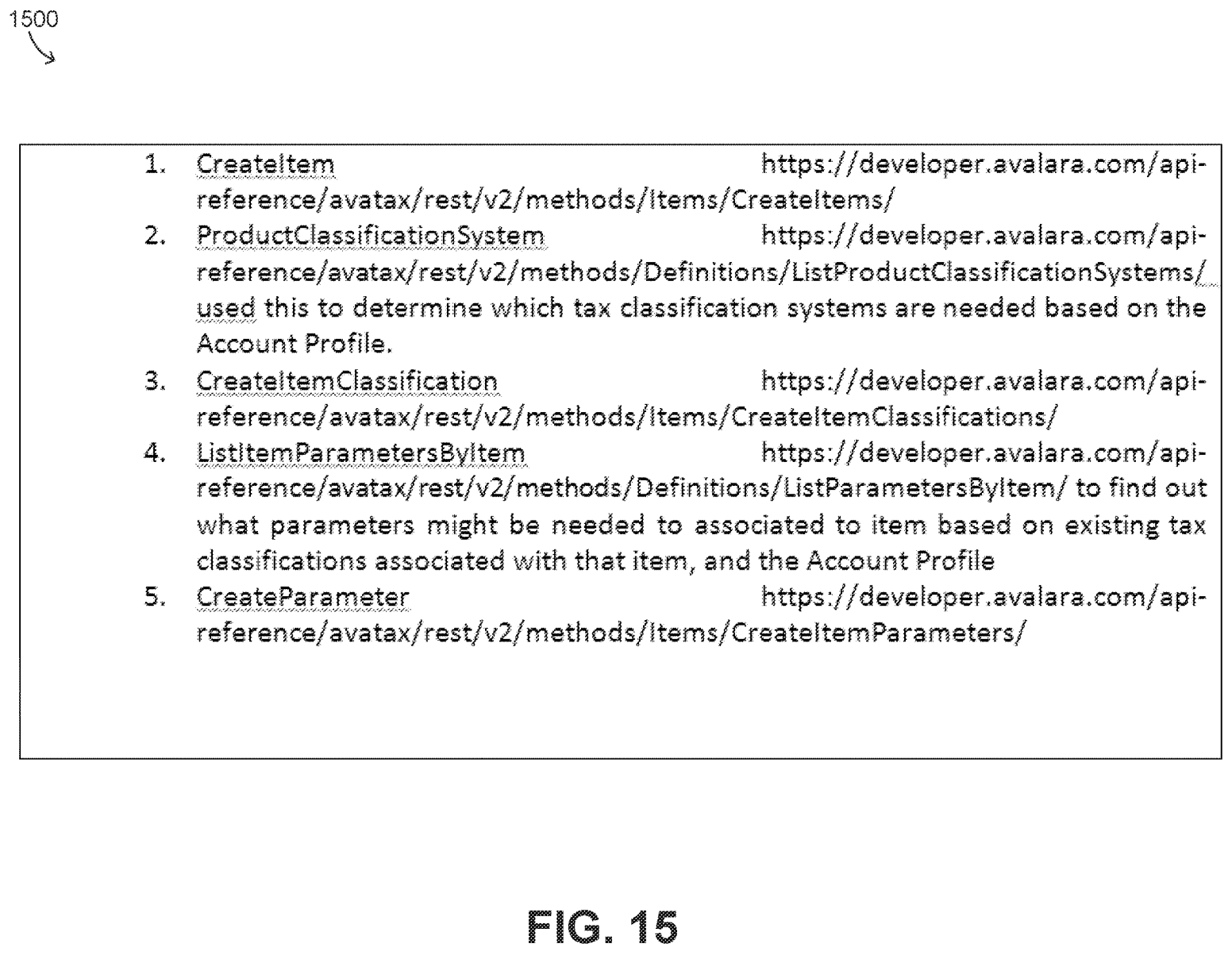

1. CreateItem
   https://developer.avalara.com/api-reference/avatax/rest/v2/methods/Items/CreateItems/

2. ProductClassificationSystem
   https://developer.avalara.com/api-reference/avatax/rest/v2/methods/Definitions/ListProductClassificationSystems/ used this to determine which tax classification systems are needed based on the Account Profile.

3. CreateItemClassification
   https://developer.avalara.com/api-reference/avatax/rest/v2/methods/Items/CreateItemClassifications/

4. ListItemParametersByItem
   https://developer.avalara.com/api-reference/avatax/rest/v2/methods/Definitions/ListParametersByItem/ to find out what parameters might be needed to associated to item based on existing tax classifications associated with that item, and the Account Profile 5. CreateParameter
   https://developer.avalara.com/api-reference/avatax/rest/v2/methods/Items/CreateItemParameters/

FIG. 15

ASSEMBLING PARAMETERS TO COMPUTE TAXES FOR CROSS-BORDER SALES

SUMMARY

Embodiments include systems and methods for assembling parameters to compute taxes for cross-border sales. These embodiments may use a customer's account profile (business locations, applicable tax types, product purchases, and other tax configuration data) to recommend which types of parameters are required to comply with reporting and tax calculation needs for that customer (e.g., seller of items) and their items.

In one example, the system may learn what parameters are required for an item in order to compute tax for the item based on preliminary data regarding the item and/or the transaction, such as, for example, an item code, an item description, the "ship to" and "ship from" locations for the item, etc. The system may determine a classification code based on such preliminary data, and use that classification code to search or query a content database storing information indicative of parameters required to compute tax for items having such a classification code and associated preliminary data. Determining whether such required parameters are missing for an item for which tax is to be computed may be performed by the system mapping the received preliminary data into the learned required parameters, and then determining whether there are any required parameters for which there has not been any preliminary data mapped into them. If it is determined there are any missing parameters required for computing tax for the items, then the system may prompt the customer (e.g., seller of the item) or other user for data values of such parameters, or otherwise obtain data values of such parameters in order to compute the tax for the item.

BRIEF DESCRIPTION OF THE SEVERAL VIEWS OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 2 is a block diagram showing a system which is an optional configuration of the system 100 of FIG. 1, in an embodiment where certain components are implemented within a tax-assisting platform.

FIG. 4 is a diagram showing an example of how a data structure of the content database of FIG. 1, can store parameters that are required in a cross-border trade context, according to various embodiments of the present disclosure.

FIG. 5 is a flow diagram of an example process for assembling parameters to compute taxes for cross-border sales, according to various embodiments of the present disclosure.

FIG. 6 is a flow diagram of an example process for supplying parameters to compute taxes for cross-border sales, according to various embodiments of the present disclosure.

FIG. 14 is an example user interface listing tax service types, and where optionally each tax type service can be turned ON/OFF in a system for assembling parameters to compute taxes for cross-border sales, according to various embodiments of the present disclosure.

FIG. 15 is an example code sequence for calling the Mapper Application Programming Interface (API) API 152 initially, according to various embodiments of the present disclosure.

DETAILED DESCRIPTION

Figure 1:
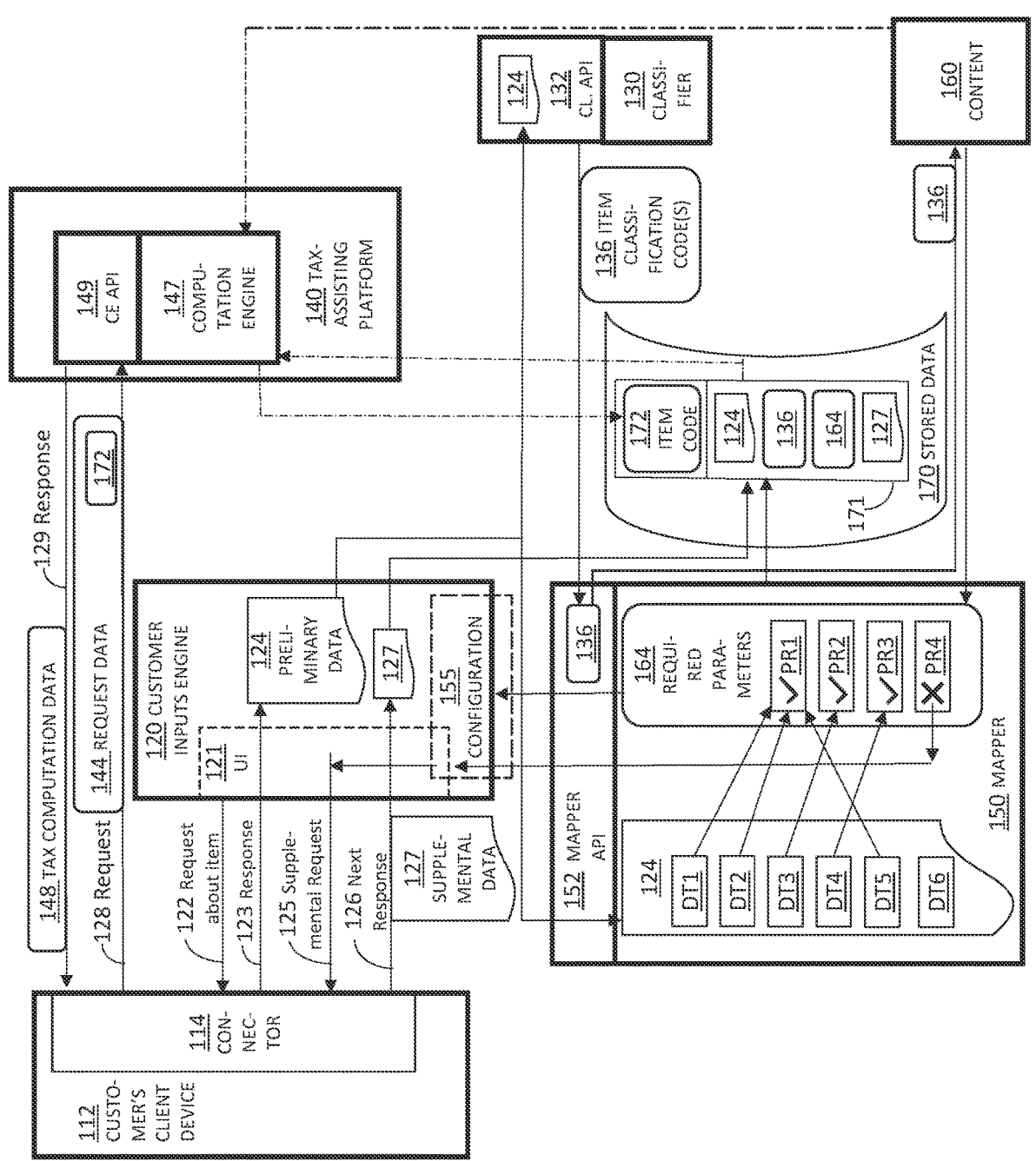
FIG. 1 is a block diagram showing an example configuration of a system for supplying and assembling parameters to compute taxes for cross-border sales, according to various embodiments of the present disclosure.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Customs duty and import tax for cross-border sales are important considerations for systems that facilitate shipping goods across international borders. A technological system that facilitates shipping goods across international borders may deal with customs duty and import tax because global sales involve more than just the cost of goods. Global sales may entail calculating shipping and insurance costs; assigning the correct tariff code and tax classifications for each product and each country of import; determining various parameters required for computing a tax for selling the item to a buyer at a particular country or other state; determining the value of the shipment for customs duty (this often includes shipping and insurance costs); knowing the de minimis threshold (the minimum declared value a shipment must have for it be subject to customs duty) of ship-to countries; attributing the proper rate of import tax for each exported item in each import country and calculating the correct tax based on such rate. Such taxes may include import taxes, duties, tariffs, sales tax, use tax, excise tax, value-added tax, industry-specific taxes, cross-border taxes, and so on. Further, for a single transaction, taxes may be due to more than one state, including various different tax states including, but not limited to: jurisdictions, countries, nations, states within nations or countries, localities within the jurisdictions, counties, cities, municipalities, etc.

Greater connectivity afforded by the technology of ecommerce and the technological areas of sophisticated international payment and translation systems have created a surge of international sales activity, particularly among small to mid-size businesses, which has in turn sparked an increase in regulations, tariffs, and border checks. Thus, the sheer number of global transactions combined with the increasing amount of different and more frequently changing regulations, treaties and tax codes makes it virtually impossible to manually determine in one's head with any useful accuracy or speed which types tax classifications need to be obtained and which specific parameters are required to comply with reporting and calculation needs for each customer and their items and then compute the corresponding taxes based on such determinations. As one example of a technological problem resulting from such circumstances, there are many specialized tax determination scenarios in a multi-tax environment for which native systems do not have any information readily available to pass in an application programming interface (API) to get a proper and accurate tax decision. In particular, when traditional systems calculate customs duty and import tax for cross-border scenarios, the existing connectors of such systems are not able to pull the required data elements from native systems because they do not have fields to support them.

The embodiments disclosed herein solve such technological problems and thus enable customers/merchants to create, manage, and understand the parameter metadata for each of the items they sell so they can store various tax classifications and parameterized content in the cloud and leverage it to help make tax decisions as well as provide a source for compliance data; which is up to date, without having to make major changes to their internal applications. For example, the tax-assisting platform disclosed herein provides interfaces that use the customer's account profile (business locations, applicable tax types, product purchases, and other tax configuration data) to recommend which types of tax classifications need to be obtained, and subsequently which specific parameters are required to comply with reporting and calculation needs for that customer and their items.

The systems and methods disclosed herein also monitor configured item data for completeness relative to a customer's account profile and changing tax law content. From this, the system (through alerts and notifications) suggests changes or additions to the metadata in order to stay compliant with current laws and reporting requirements. Other technological improvements provided by the systems and methods disclosed herein include enabling customers and partners to more efficiently take advantage of multi-tax scenarios with their existing automated tax system integrations, thus allowing them to expand their offering to other market segments and enabling technological tax-assisting systems to more efficiently and accurately manage the product attributes required to sell various different customers' goods and services. For example, data about a purchasable item may be stored. This stored data may include, but is not limited to: a description of the item, a stock keeping unit (SKU) or other identification of the item that allows it to be tracked for inventory purposes; a category of the item; a uniform resource locator (URL) or other computer network address pointing to where an image of the item is stored; a "ship to" and "ship from" location for the item, attributes of the item; and so on. In the present example, a customer or partner, such as a seller of the item, may create or generate a data record representing the item in a "What you sell" list provided by the tax-assisting platform having a classification for selling cross border from, for instance Japan (JP) to Germany (DE), using an item namespace in a classifier API (Application Programming Interface). Via the classifier API, the classifier will then pass to the tax-assisting platform an itemCode for the item being sold and imported into Germany and the tax-assisting platform will then calculate tax and duties based on the item configuration in the tax-assisting platform.

FIG. 1 is a block diagram showing an example configuration of a system 100 for supplying and assembling parameters 164 to compute taxes for cross-border sales, according to various embodiments of the present disclosure.

Shown in FIG. 1 are a customer's client device 112, a customer inputs engine 120, a mapper 150 (in communication with a mapper API 152), a tax-assisting platform 140, a classifier 130 (in communication with a classifier API 132) and a content database 160. In this example, one or more of the customer's client device 112, the customer inputs engine 120, the mapper 150, the tax-assisting platform 140, the classifier 130 and the content database 160 may be, or may be implemented by, one or more client or server computers. In some embodiments, one or more of the customer inputs engine 120, mapper 150, tax-assisting platform 140, classifier 130 and content database 160 may be implemented by the same computer. In various embodiments, the customer inputs engine 120, mapper 150, tax-assisting platform 140, classifier 130 and/or content database 160 can be implemented in the cloud, on the premises of a provider, in a combination of the two, and so on. Of course, additional server computers may be used for a single service, for example in a peer-to-peer configuration, with the operations of the service distributed among them. The server computers can be located at a single geographic location or be distributed across multiple locations. Similarly, additional databases may be used for the service, and so on.

In this example, the customer's client device 112, customer inputs engine 120, mapper 150, tax-assisting platform 140, classifier 130 and content database 160 may communicate via one or more communications networks. Such one or more communication networks may include any type of network, such as a local area network (LAN), a metropolitan area network (MAN), a wide area network (WAN), or the Internet. In some embodiments, the one or more communication networks are considered to be the cloud.

In this example, tax-assisting platform 140 includes a computation engine 147. Computation engine 147 may compute taxes for various transactions for a plurality of different customers (e.g., sellers of items) and be invoked via a tax computation engine (CE) API 149. Only one CE API 149 is shown implemented here, while multiple ones may be implemented instead, for example, one for invoking each of multiple tax computation engines. For example, an item code 172 may be created by the system 100 to identify in stored data 170 a record 171 of the item. Item code 172 can be a long alphanumeric string, etc. Item code 172 can be decided by the customer, who is the item seller in the present embodiment. In various embodiments, a string for the item code 172 can be proposed for the customer's acceptance. The record 171 of the item may include the item code 172 of the item and data used to compute tax for a transaction involving the item. In particular, the elements of record 171 can be used by computation engine 147 to produce a computation, such as of tax computation data 148, in response to a request 128 having request data that includes the item code 172 identifying the item. However, before the computation engine 147 computes tax for a particular transaction involving a particular item for a customer (e.g., for the seller of the item), the tax-assisting platform 140 may require certain information about the item and/or the transaction, which is to be stored in the record 171 of the item. For example, such information may include, but is not limited to: a category of the item, an item description or identifier, a SKU associated with the item, a URL (Uniform Resource Locator) where an image of the item or other information regarding the item is stored, a ship from location, a ship to location, main elements of the item, weight of the item, measurements of the item, value of the item, amount of the transaction, units for all these parameters, other attributes of the item or the transaction, and so on. Obtaining some or all of such information may be initiated by transmitting a request about the item 122 to the connector 114 of the customer's client device 112 via the user interface 121 of the customer inputs engine 120.

In response to the request 122 about the item, the customer's client device 112 may transmit a response 123 to the customer inputs engine via the user interface 121. The response 123 may include preliminary data 124 requested by the request 122. This preliminary data 124 is then sent by the customer inputs engine 120 to the classifier API 132 and the mapper API 152. The classifier API 132 invokes classifier 130, and the classifier 130 looks up the classification code 136 of the item based on preliminary data 124 of the item. The classifier 130 then returns a classification code 136 for the item to the mapper API 152 via the classifier API 132. The mapper 150 then stores the classification code 136 in the record 171 for the item in the stored data 170.

Classification is the process of assigning codes to products for import or export, according to a system of classification. One system of classification is the Harmonized Commodity Description and Coding System, which is often abbreviated merely as HS. The HS was created and is administered by the Brussels-based World Customs Organization (WCO).

The HS is an international standard for reporting goods to customs for purposes of cross-border trade. In fact, the HS defines codes, also known as HS codes, for a very large fraction of all items traded internationally. And most customs authorities require HS codes to be provided on import and export declarations.

HS codes are 6-digit numerical codes that describe "what" is being shipped to and from countries worldwide. Of those, the first two numbers define a "Chapter", the second two a "Heading", and the last two a "Subheading". For instance, as of the time of this writing, HS Code 850870 defines "parts of vacuum cleaners". But HS codes may change every five years.

The first 6 digits of the HS code are common to all countries. Beyond those, each country is permitted to add additional numbers to suit its own tariff and statistical needs, creating 8-, 10-, and sometimes 12-digit national codes. And these national tariff codes can change, sometimes several times per year.

The mapper 150 then transmits the classification code 136 for the item to the content database 160 via the mapper API 152. In some embodiments, the classification code 136 may be communicated directly to the content database 160. The classification code 136 may be communicated to the content database 160 as a database query or included in a database query. For example, the mapper 150 may generate, via the mapper API 152, a parameter request for parameters required for computing a tax for selling the item to a buyer at a particular state. Data indicating the particular state the item is to be shipped from and shipped to may have been received by the classifier API 132 and the mapper API 152 as part of the preliminary data 124. The mapper 150 may communicate, via the mapper API 152, the parameter request to the content database 160. The content database 160 then uses the classification code 136 to query the content database 160 to determine what the required parameters 164 are for computing tax for items having or otherwise associated with the particular classification code 136 and based on the data indicating the particular state the item is to be shipped from and shipped to. The content database 160 may then, in response to the parameter request, input to the mapper 150 the parameters 164 required for computing the tax for selling the item to a buyer at the particular state (e.g., parameters PR1, PR2, PR3 and PR4). The parameters 164 required for computing the tax for selling the item to a buyer at the particular state are also stored in the record 171 for the item in the stored data 170. The parameters 164 required for computing the tax for selling the item to a buyer at the particular state may also be transmitted to the configuration control 155 of the customer inputs engine 120 for future reference. Various different numbers and types of parameters may be determined and used in various corresponding different embodiments.

The mapper 150 may then map the preliminary data into the required parameters. This is to determine for which of the required parameters the system is missing corresponding data, since such data is needed to compute the tax for selling the item to a buyer at the particular state. In the example shown, preliminary data 124 and required parameters 164 include preliminary data values denoted as DT1, DT2 and DT5 mapped into required parameter PR1, preliminary data value DT3 mapped into required parameter PR2, preliminary data value DT4 mapped into required parameter PR3 and preliminary data value DT6 does not have a required parameter associated with it. However, required parameter PR4 has not had any preliminary data mapped into it. This indicates that the system is missing corresponding data for required parameter PR4 that is needed to compute the tax for selling the item to a buyer at the particular state. Thus, if there are any required parameters for which there is missing data based on the mapping, the mapper 150 requests such missing data via the customer inputs engine 120. For example, the mapper 150, via the mapper API 152, transmits a request for such missing data to the customer inputs engine 120 that is handled by the configuration control 155 of the customer inputs engine 120, which then transmits a supplemental request 125 for the missing data via the user interface 121 of the customer inputs engine 120. For example, the supplemental request 125 may include, or be in the form of, a parameter error report, a listing of missing parameters, additional parameters, etc. In the present example mapper 150, via the mapper API 152, transmits a request for the missing data corresponding to the required parameter PR4 to the customer inputs engine 120, which then transmits a supplemental request 125 for the missing data corresponding to the required parameter PR4 via the user interface 121 of the customer inputs engine 120.

A next response 126 including supplemental data 127 is then sent via the user interface 121 in response to the supplemental request 125 and stored in the item record 171 in stored data 170 along with, and associated with, the item code 172, the corresponding preliminary data 124, the classification code 136 and the required parameters 164 for the item in the record 171 of the item. In some embodiments, such preliminary data 124 and/or supplemental data 127 may be used to create or update record 171. Also, although the preliminary data 124 and supplemental data 127 is shown in the present example as being obtained from customer inputs via a user interface 121, some or all of such preliminary data 124 and/or supplemental data 127 may be obtained via automated smart systems that extract such data from other stored data of various other systems and locations.

Such supplemental requests may be sent and corresponding next responses including the supplemental data 127 may be received for each required parameter for that item for which there had not been any preliminary data mapped into it. In some embodiments, a single request may be sent for missing data for all the required parameters for which there had not been any preliminary data mapped for that item and one or more responses including the supplemental data 127 may be received in response to such a request, which may then be stored in the corresponding record 171 of the item. The stored data 170 may include multiple item records for a plurality of different items. The stored data 170 may also include multiple item records for a plurality of different customers each having a plurality of different item records for different items of that customer. Each record 171 may be identified with a unique item code 172 associated with item corresponding to the particular record 171.

The CE API 149 may then receive the request 128 to compute the tax for a transaction involving the item associated with record 171. The request 128 may have request data 144 including the item code 172 identifying the item. The computation engine 147 receives the item code 172 via the CE API 149 and uses the item code 172 to identify the record 171 of the item by transmitting a request for such data to the stored data 170 using the item code 172.

Figure 7A:
FIGS. 7A-7G are block diagrams showing, in sequence, operations of various components the system of FIG. 1 for supplying and assembling parameters to compute taxes for cross-border sales, according to various embodiments of the present disclosure.
Figure 7B:
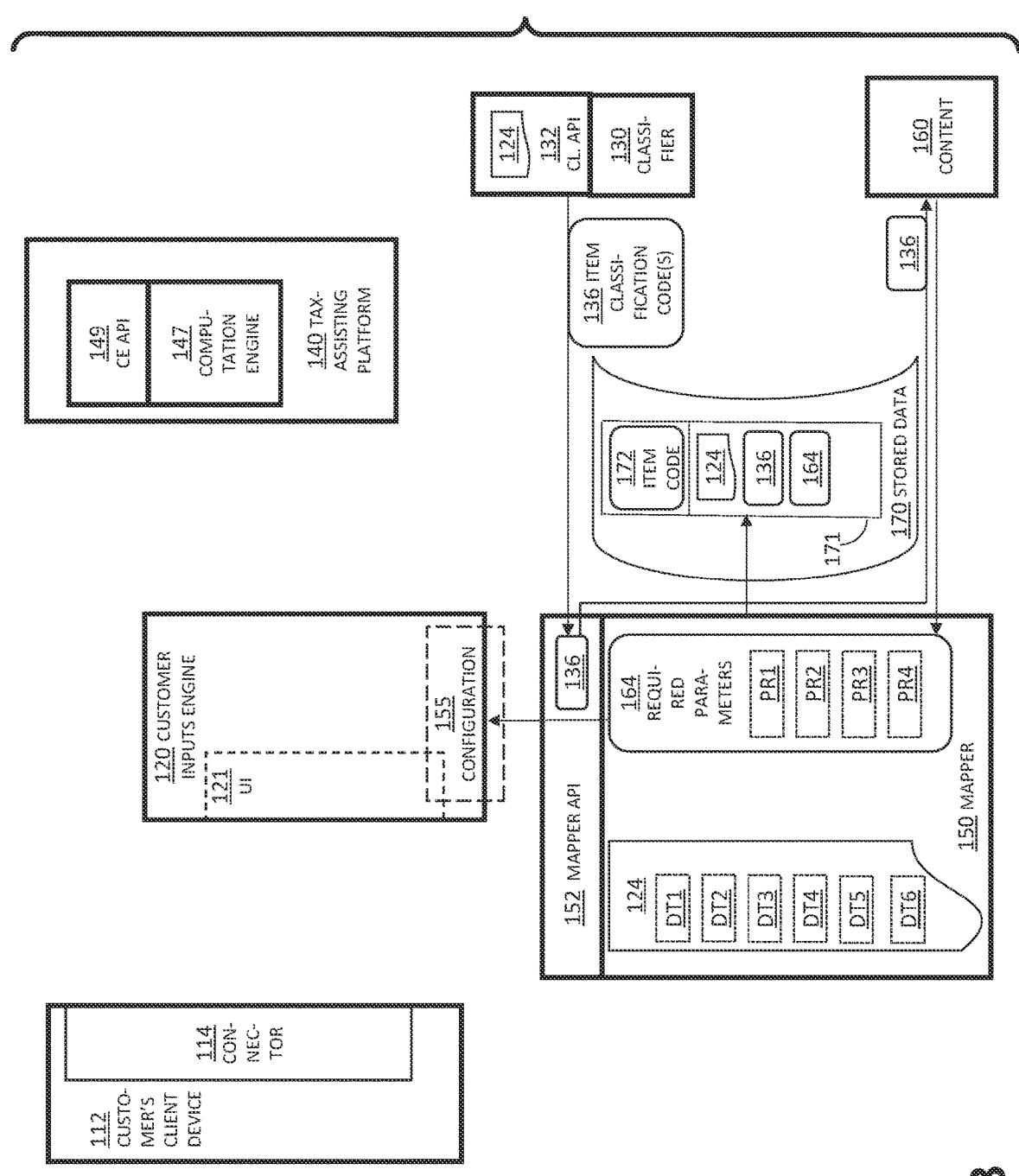
Figure 7C:
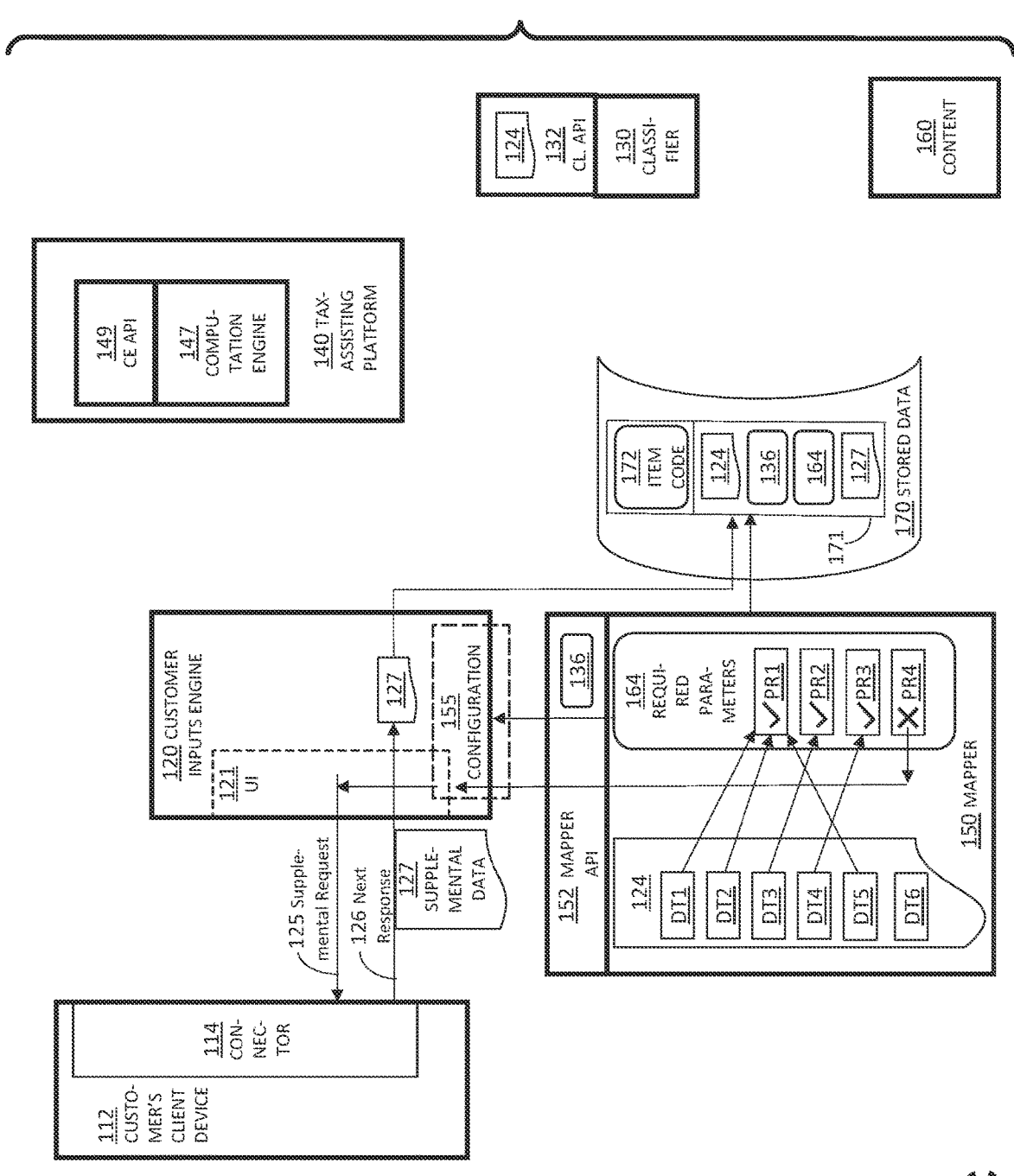
Figure 7D:
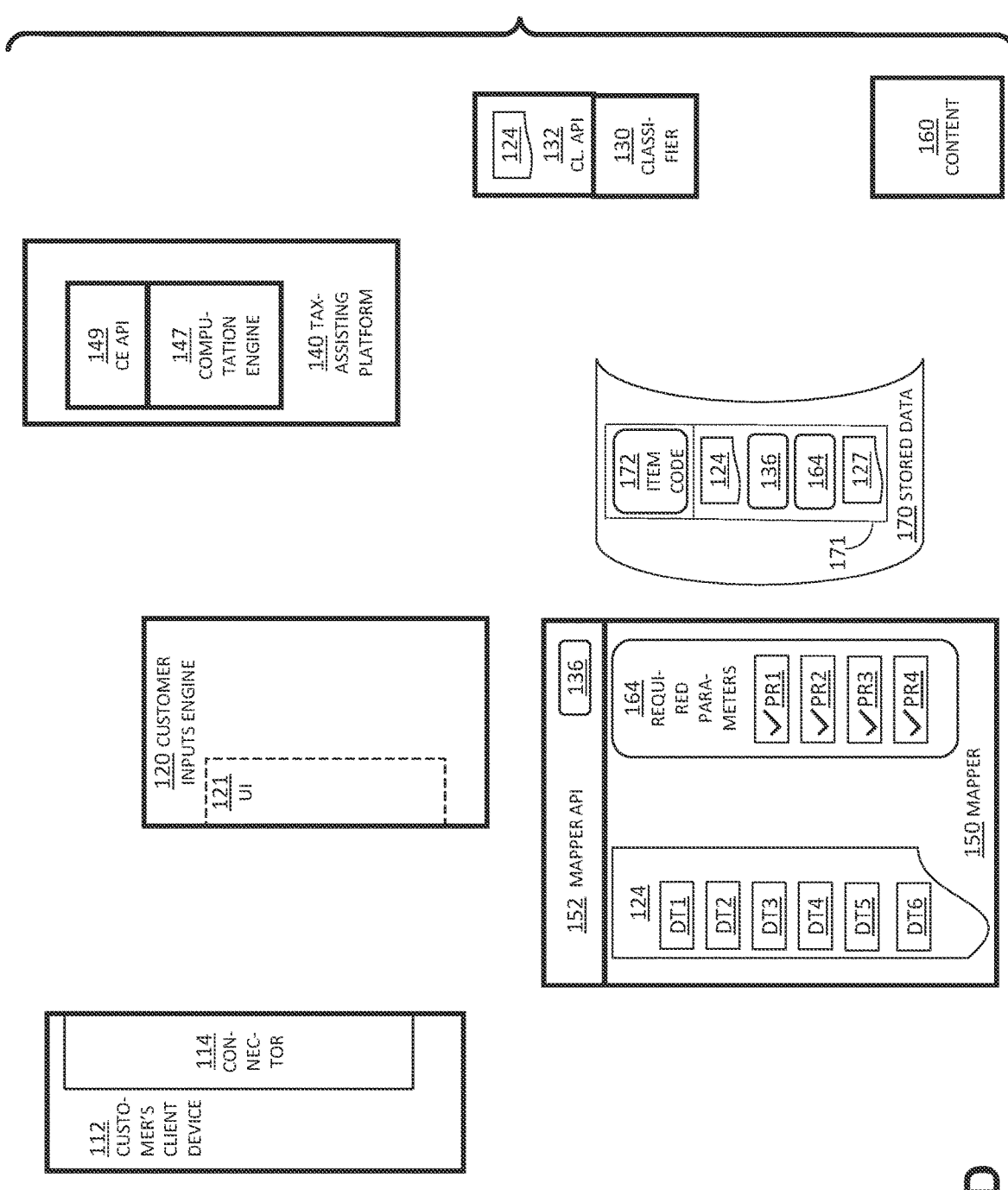
Figure 7E:
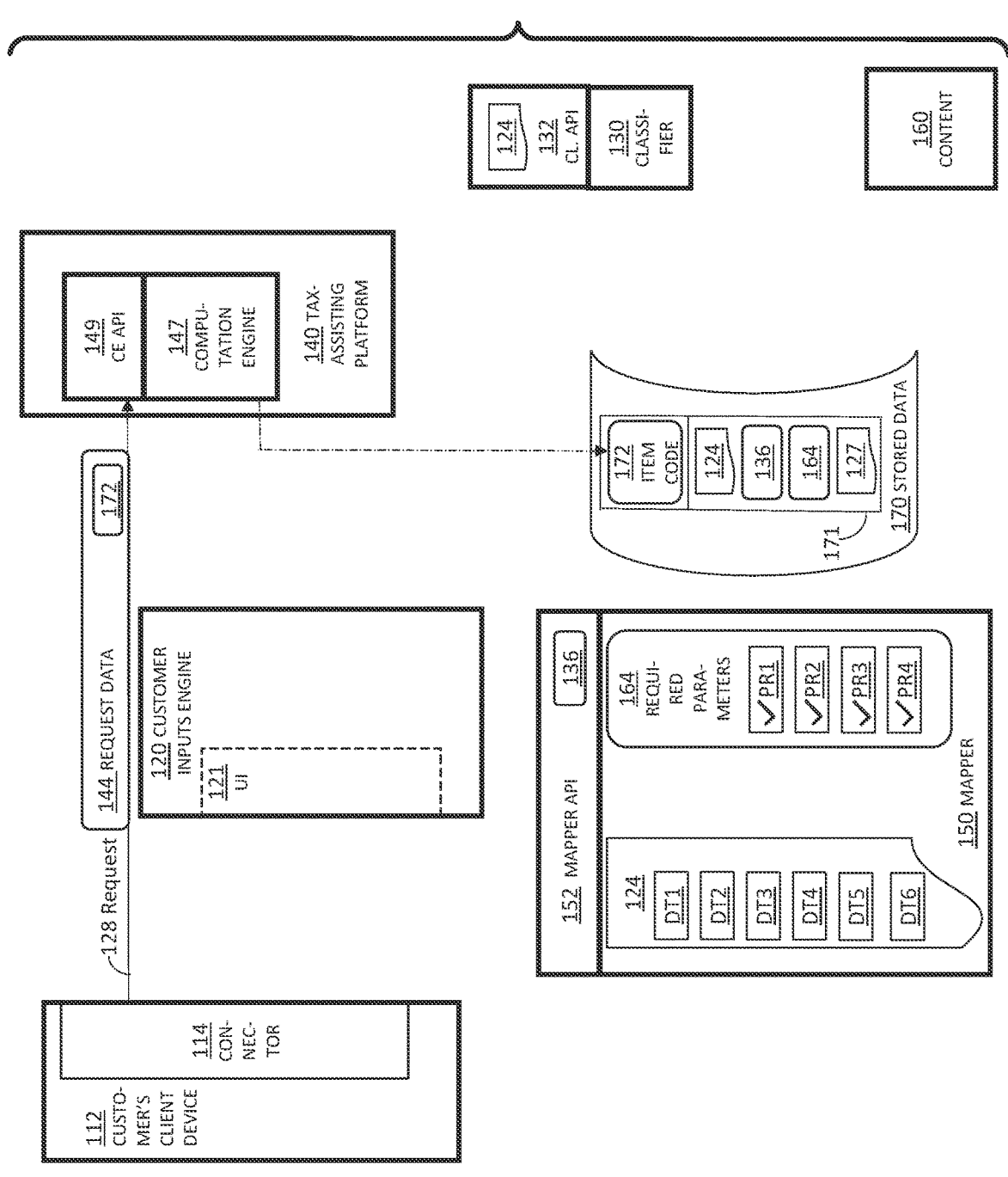
Figure 7F:
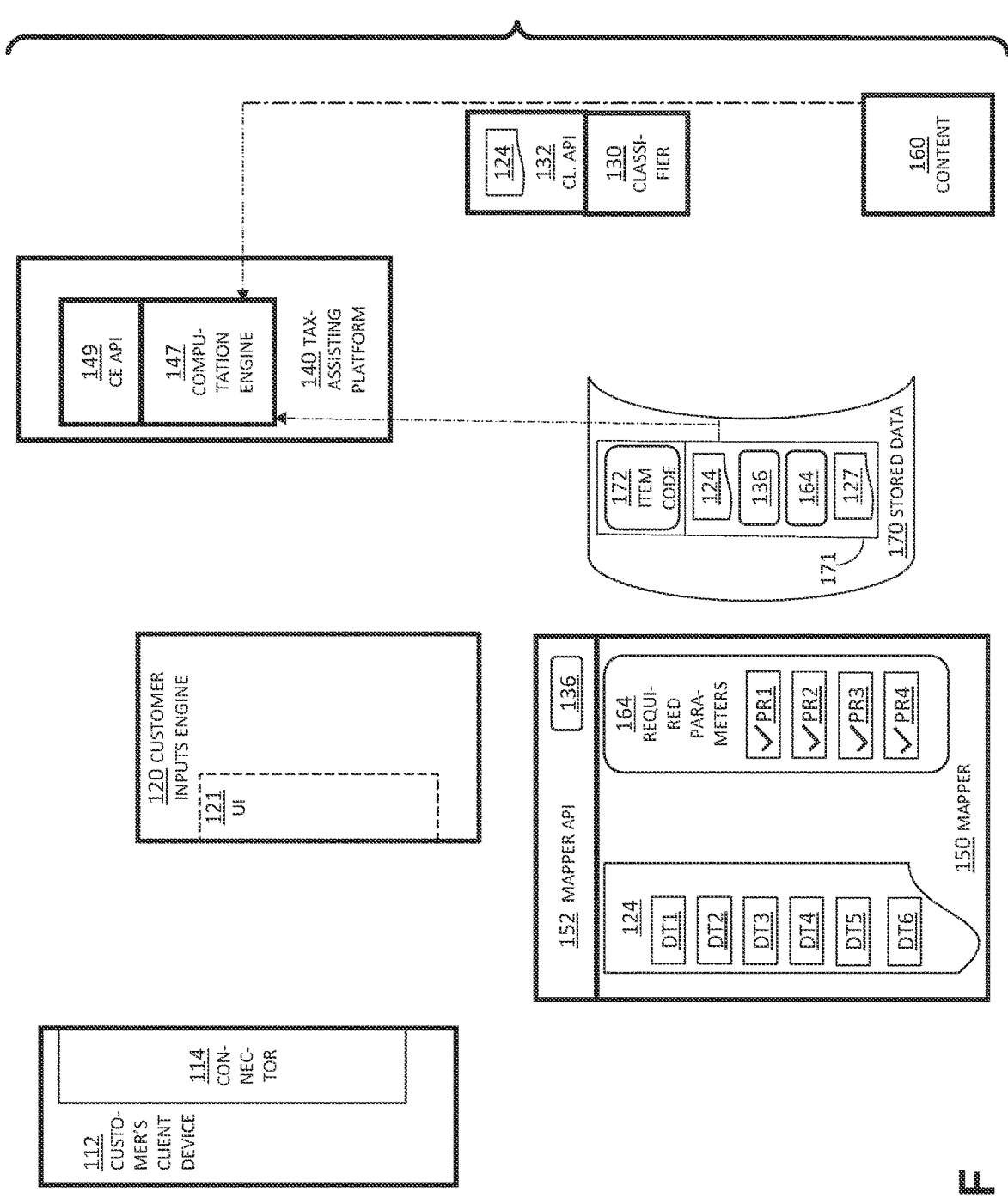

As shown in the operation 710 illustrated in FIG. 7F, in response to the request, the computation engine 147 receives items stored in the record 171 of the item, for example, the mapped preliminary data 124 and the mapped supplemental data 127 for the item and updated tax rules and/or formulas (e.g., such as those shown in FIG. 4) stored in the content database 160 for computing tax for the item based on the mapped preliminary data 124 and on the mapped supplemental data 127 stored in the record 171 for the item.

The computation engine 147 then computes, responsive to the request 128 to compute the tax, the tax for the transaction involving the item based on the mapped preliminary data 124 and on the mapped supplemental data 127 stored in the record 171 and also the updated tax rules and/or formulas (e.g., such as those shown in FIG. 4) stored in the content database 160 for computing tax for the item. In particular, the elements of record 171, such as the corresponding preliminary data 124, the classification code 136 and the required parameters 164 for the item in the record 171 of the item as well as the updated tax rules and/or formulas, are used by computation engine 147 to produce a computation 148. The computation 148 may be a computation of tax in response to the request 128 having request data including the item code 172 identifying the item. The computation engine 147 then transmits to the customer's client device 112, via the CE API 149 and the connector 114 of the customer's client device 112, the response 129 including the tax computation 148.

FIG. 2 is a block diagram showing a system 200, which is an optional configuration of the system 100 of FIG. 1, in an embodiment where certain components are implemented within a tax-assisting platform.

In particular, in the optional configuration shown in FIG. 2, the customer inputs engine 120, the computation engine 147, the CE API 149, the mapper 150, the mapper API 152, the classifier 130, the classifier API 132 and the stored data 170 are all components of the tax-assisting platform 140. The customer inputs engine 120, the computation engine 147, the CE API 149, the mapper 150, the mapper API 152, the classifier 130, the classifier API 132 and the stored data 170 may be implemented on a single computer, server or system. Alternatively, in some embodiments, one or more of the customer inputs engine 120, the computation engine 147, the CE API 149, the mapper 150, the mapper API 152, the classifier 130, the classifier API 132 and the stored data 170 may be distributed systems in communication with each other that make up various parts of the tax-assisting platform 140. The tax-assisting platform 140 may be implemented by one or more server computers and one or more databases storing data, such as stored data 170. Tax-assisting platform 140 can be implemented in the cloud, on the premises of a provider, in a combination of the two, and so on. Of course, additional server computers may be used for a single service, for example in a peer-to-peer configuration, with the operations of the service distributed among them. The server computers can be located at a single geographic location or be distributed across multiple locations. Similarly, additional databases may be used for the service, and so on.

Figure 3:
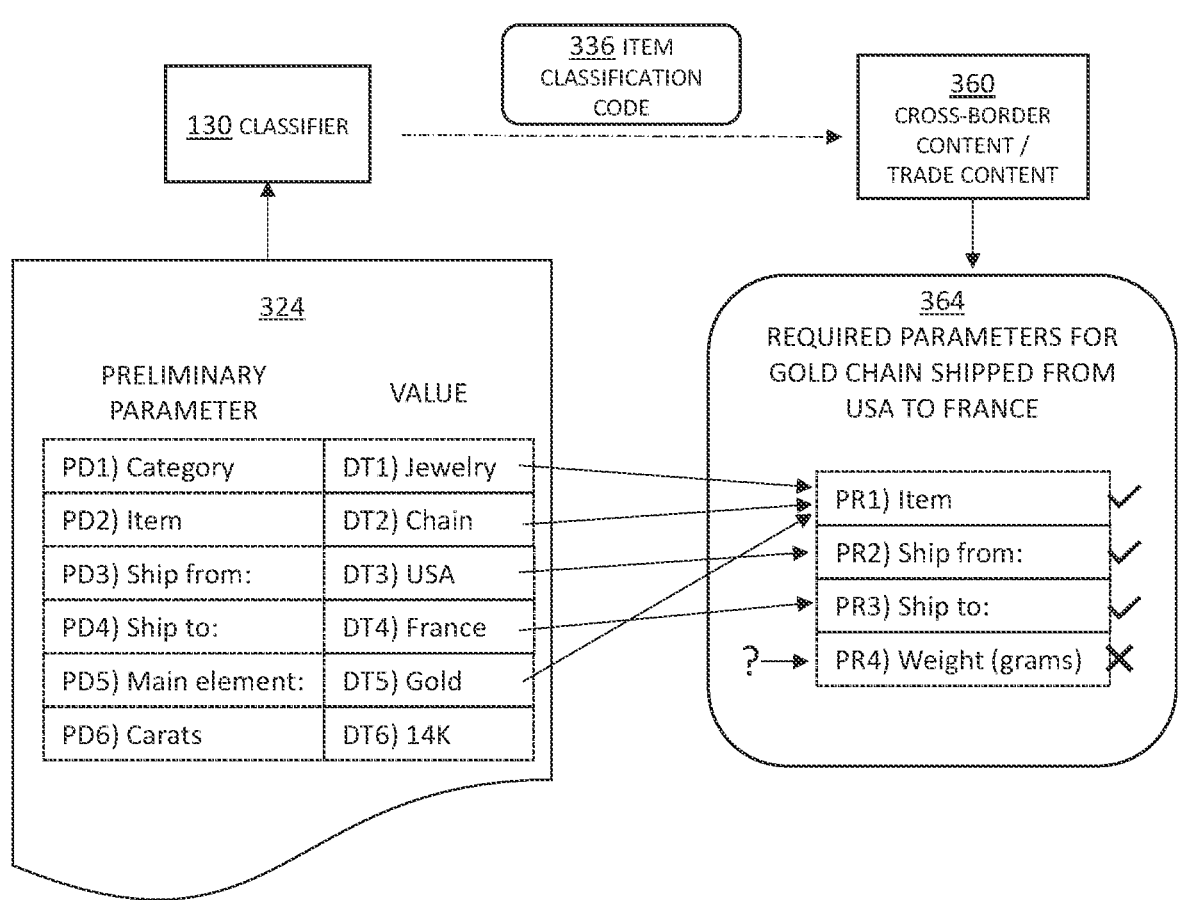
FIG. 3 is a block diagram showing an example of mapping received preliminary data into learned required parameters in a cross-border trade context, according to various embodiments of the present disclosure.

FIG. 3 is a block diagram 300 showing an example of mapping received preliminary data 324 into learned required parameters 364 in a cross-border trade context, according to various embodiments of the present disclosure.

Shown is preliminary data 324, which is an example of preliminary data 124 of FIGS. 1 and 2, provided to the classifier 130. For example, preliminary data 324 may be requested by the request about the item 122 and included in the response 123 to the request about the item 122 shown in FIG. 1. In the present example, preliminary data 324 includes preliminary parameters for the particular item and corresponding values of those preliminary parameters. Also shown is the item classification code 336, which is looked up or otherwise determined by the classifier 130 based on the preliminary data 324. The item classification code 336 is an example of the classification code 136 shown in FIGS. 1 and 2. The classification code 336 is transmitted from the classifier 130 (e.g., as or part of a parameter request) to the cross-border content/trade content database 360, such that the cross-border content/trade content database 360 can return the parameters required for computing the tax for the item. The cross-border content/trade content database 360 is an example of the content database 160 of FIGS. 1 and 2. Such parameters required for computing the tax for the item may be associated with the classification code 336 of the item and other preliminary data 324 in the cross-border content/trade content database 360 and thus found in and returned by the cross-border content/trade content database 360 accordingly.

In the present example, based on the preliminary data 324, the system determines the item is a gold chain being shipped from USA to France. Thus, the parameters required for computing the tax for the item are those which are required parameters for a gold chain shipped from USA to France 364. The required parameters for a gold chain shipped from USA to France 364 are input by the cross-border content/trade content database 360 to a mapper, such as the mapper 150 of FIG. 1 via a mapper API 152 of FIG. 1. The corresponding values of the preliminary parameters of preliminary data 324 for the gold chain are then mapped, such as by the mapper 150 of FIG. 1, into the required parameters 364 for a gold chain shipped from USA to France. In particular, in the present example, the data value DT1 "Jewelry" of parameter PD1 "Category", the data value DT2 "Chain" of parameter PD2 "Item" and the data value DT5 "Gold" of parameter PD5 "Main element" are mapped into the required parameter PR1 "Item". Also, the data value DT3 "USA" of parameter PD3 "Ship from" is mapped into the required parameter PR2 "Ship from" and the data value DT4 "France" of parameter PD4 "Ship to" is mapped into the required parameter PR3 "Ship to".

However, required parameter PR4 "Weight (grams)" has not had any preliminary data values mapped into it from the preliminary data 324 for the gold chain. According to the cross-border content/trade content database 360, this parameter is required to compute tax for a gold chain being shipped from the US to France. Thus, in response to identifying such missing required data, the system requests such missing data, for example, via the customer inputs engine 120 of FIG. 1.

FIG. 4 is a diagram 460 showing an example of how a data structure of the content database 160 of FIG. 1, can store parameters that are required in a cross-border trade context, according to various embodiments of the present disclosure The example shown in FIG. 4 corresponds to the cross-border content/trade content database 360 of FIG. 3, which is an example of the content database 160 of FIG. 1. In particular, the table 410 of the cross-border content/trade content database 360 may be associated with the classification code 336 of the gold chain item of FIG. 3. Parameters required for computing the tax for the gold chain item may be found by referencing in table 410 the corresponding "Ship From" and "Ship To" values of the preliminary data 324 associated with the particular transaction for the gold chain item. In the present example, the "Ship From" location indicated by the preliminary data 324 is "Country A" and the "Ship To" location indicated by the preliminary data 324 is "Country C". This references "CELL AC" in table 410. Based on this particular combination of "Country A" being the "Ship From" location and "Country C" being the "Ship To" location, "CELL AC" includes various tax-related data regarding shipments of gold chains from Country A to Country and required parameters for computing tax for shipments of gold chains from Country A to Country C. For example, "CELL AC" may include export rules of Country A, specifics as to exports to Country C from Country A (e.g., treaties, restrictions, etc.), specifics about the items being shipped, item description (e.g., gold chain), export duty information, if any, for Country A, etc., import rules of Country C, specifics as to imports from Country A into Country C (e.g., treaties, restrictions, etc.), specifics about the items being shipped, item description (e.g., gold chain).

In the present example, "CELL AC" includes parameters needed to compute tax for shipments of gold chains from Country A to Country C, including the weight of the item in grams (Wt) and a formula for computing the import duty for shipments of gold chains from Country A to Country C based on the weight (Import duty=Wt×0.28 Eur). Thus, the weight of the gold chain is one of the required parameters to compute tax for a gold chain shipped from Country A into Country C that are input by the cross-border content/trade content database 360 into the system, such as into the mapper 150 of FIG. 1. As shown in FIG. 3, the weight of the gold chain item is identified as required parameter missing from the preliminary data 324 based on such input of the required parameters 364 by the cross-border content/trade content database 360 and subsequent mapping of the preliminary data 324 to the required parameters 364, which may be performed by the mapper 150 of FIG. 1. The cross-border content/trade content database 360 of FIG. 3 may include many tables, such as table 410, that each corresponds to different items or categories or classifications of items. In some embodiments, the classification of an item, and thus the corresponding table or other data structure in the cross-border content/trade content database 360 including required parameters to compute tax for that item or classification of item, may be identified by the item classification code (e.g., the item classification code 336 of FIG. 3).

FIG. 5 is a flow diagram of an example process 500 for assembling parameters to compute taxes for cross-border sales, according to various embodiments of the present disclosure.

At 510, the system 100 of FIG. 1 receives preliminary data about an item. This could be preliminary data 124.

At 520, the system 100 looks up, based on the received preliminary data, a classification code for the item. This could be item classification code 136.

At 530, the system 100 generates, based on the looked-up classification code, a parameter request for parameters required for computing a tax for selling the item to a buyer at a particular state. The parameter request may be transmitted, for example, to content database 160.

At 540, the system 100 inputs, responsive to the generated parameter request, parameters required for computing the tax. These can be, for example, required parameters 164 or 364.

At 550, the system 100 maps the received preliminary data into the required parameters. For instance, this can be where received preliminary data 324 is mapped into the required parameters 364.

At 560, the system determines, after the mapping, whether a certain one of the required parameters has not had any of the preliminary data mapped into it.

If it is determined at 560 that a certain one of the required parameters has not had any of the preliminary data mapped into it, the system 100 proceeds to 562.

At 562, the system 100 transmits, based on the determination, a supplemental request for supplemental data for the certain parameter. The supplemental request can be supplemental request 125.

At 564, the system 100 receives, responsive to the transmitted supplemental request, supplemental data. The supplemental data could be supplemental data 127.

At 567, the system 100, maps the received supplemental data into the certain parameter and then returns to 560.

If it is determined at 560 that there are no required parameters that have not had any of the preliminary data mapped into them, the system 100 proceeds to 570.

At 570, the system 100 receives a request to compute the tax.

At 580, the system 100 computes, responsive to the request to compute the tax, the tax based on the mapped preliminary data and on the mapped supplemental data.

At 590, the system 100 transmits a response encoding the computed tax.

FIG. 6 is a flow diagram of an example process 600 for supplying parameters to compute taxes for cross-border sales, according to various embodiments of the present disclosure.

At 610, a computer system, for example, the customer's client device 112 of FIG. 1 or other computer system associated with the customer, is caused to store preliminary data about an item.

At 620, the customer's client device 112 or other computer system associated with the customer is caused to render the item available for sale to a buyer in a base state by using the stored preliminary data.

At 630, the customer's client device 112 or other computer system associated with the customer is requested to render the item available for sale to a buyer in a particular state distinct from the base state.

At 662, the customer's client device 112 or other computer system associated with the customer receives a supplemental request for supplemental data for a certain parameter. For example, the certain parameter may be a certain one of parameters required for computing a tax for selling the item in the particular state, but that has not had any of preliminary data mapped into the certain one of the required parameters.

At 664 the customer's client device 112 or other computer system associated with the customer transmits to the customer inputs engine 120 of FIG. 1 or the tax assisting platform 140 of FIG. 2 and responsive to the supplemental request, supplemental data. This may in turn cause the tax assisting platform 140 to receive the transmitted supplemental data and map the received supplemental data into the certain parameter.

At 670, the customer's client device 112 or other computer system associated with the customer transmits to the tax assisting platform 140 a request to compute the tax, thereby causing the tax assisting platform 140 to compute the tax based on the mapped preliminary data and on the mapped supplemental data.

At 690, the customer's client device 112 or other computer system associated with the customer receives a response encoding the computed tax.

FIGS. 7A-7G are block diagrams showing, in sequence, operations of various components the system 100 of FIG. 1 for supplying and assembling parameters to compute taxes for cross-border sales, according to various embodiments of the present disclosure. In the description of FIGS. 7A-7G below, in order to more clearly illustrate which components are performing which operations and the corresponding flow of data, many of the operations of the various components of system 100 of FIG. 1 and system 200 of FIG. 2 are explained again below with each of FIGS. 7A-7G showing the particular respective components involved in each operation in isolation from the other components of system 100 and system 200.

As shown in the operation 700 illustrated in FIG. 7A, before the computation engine 147 computes tax for a particular transaction involving a particular item for a customer (e.g., for the seller of the item), the tax-assisting platform 140 may require certain information about the item and the transaction, which is to be stored in the record 171 of the item. Obtaining some or all of such information may be initiated by transmitting a request about the item 122 to the connector 114 of the customer's client device 112 via the user interface 121 of the customer inputs engine 120.

The information that is sought at operation 700 may include, but is not limited to: a category of the item, an item description or identifier, a SKU associated with the item, a URL where an image of the item or other information regarding the item is stored, a ship from location, a ship to location, main elements of the item, weight of the item, measurements of the item, value of the item, amount of the transaction, other attributes of the item or the transaction, a government agency that regulates the item or its sale, or imposes regulatory requirements on the item or its sale, and so on.

Regarding embodiments for satisfying government agencies, for the United States (U.S.), such agencies include but are not limited to: from the U.S. Department of Commerce: Bureau of Industry and Security, Enforcement and Compliance, Foreign Trade Zones Board; from the U.S. Department of Transportation: Federal Motor Carrier Safety Administration and Research & Innovative Technology, Bureau of Transportation Statistics; the U.S. Consumer Products Safety Commission, and so on.

In response to the request about the item 122, the customer's client device 112 may transmit a response 123 to the customer inputs engine via the user interface 121. The response 123 may include preliminary data 124 requested by the request about the item 122. This preliminary data 124 is then transmitted by the customer inputs engine 120 to the classifier API 132 and the mapper API 152. Some or all of the preliminary data 124 is also stored in mapper 150, for example, denoted as data values DT1, DT2, DT3, DT4, DT5, DT6 and in stored data 170. The classifier API 132 invokes classifier 130 and the classifier 130 looks up the classification code 136 of the item based on preliminary data 124 of the item. The classifier 130 then returns the classification code 136 for the item to the mapper API 152 via the classifier API 132. The mapper 150 also stores the classification code 136 in the record 171 for the item in the stored data 170.

As shown in in the operation 702 illustrated in FIG. 7B, the mapper 150 then transmits the classification code 136 for the item to the content database 160 via the mapper API 152. The classification code 136 may be communicated to the content database 160 as a database query or included in a database query. For example, the mapper 150 may generate, via the mapper API 152, a parameter request for parameters required for computing a tax for selling the item to a buyer at a particular state. Data indicating the particular state the item is to be shipped from and shipped to may have been received by the classifier API 132 and the mapper API 152 as part of the preliminary data 124. The mapper 150 may communicate, via the mapper API 152, the parameter request to the content database 160. The content database 160 then uses the classification code 136 to query the content database 160 to determine what the required parameters 164 are for computing tax for items having or otherwise associated with the particular classification code 136 and based on the data indicating the particular state the item is to be shipped from and shipped to. The content database 160 may then, in response to the parameter request, input to the mapper 150 the parameters 164 required for computing the tax for selling the item to a buyer at the particular state (e.g., parameters denoted as PR1, PR2, PR3 and PR4). The parameters 164 required for computing the tax for selling the item to a buyer at the particular state are also stored in the record 171 for the item in the stored data 170. The parameters 164 required for computing the tax for selling the item to a buyer at the particular state may also be transmitted to the configuration control 155 of the customer inputs engine 120 for future reference. Various different numbers and types of parameters may be determined and used in various corresponding different embodiments.

As shown in the operation 704 illustrated in FIG. 7C, the mapper 150 then maps the preliminary data into the required parameters. This is to determine for which of the required parameters the system is missing corresponding data, since such data is needed to compute the tax for selling the item to a buyer at the particular state. In the example shown, preliminary data 124 and required parameters 164 include preliminary data values denoted as DT1, DT2 and DT5 mapped into required parameter PR1, preliminary data value DT3 mapped into required parameter PR2, preliminary data value DT4 mapped into required parameter PR3 and preliminary data value DT6 does not have a required parameter associated with it. However, required parameter PR4 has not had any preliminary data mapped into it. This indicates that the system is missing corresponding data for required parameter PR4 that is needed to compute the tax for selling the item to a buyer at the particular state. Thus, if there are any required parameters for which there is missing data based on the mapping, the mapper 150 requests such missing data via the customer inputs engine 120. For example, the mapper 150, via the mapper API 152, transmits a request for such missing data to the customer inputs engine 120 that is handled by the configuration control 155 of the customer inputs engine 120, which then transmits a supplemental request 125 for the missing data via the user interface 121 of the customer inputs engine 120. For example, the supplemental request 125 may include, or be in the form of, a parameter error report, a listing of missing parameters, additional parameters, etc. In the present example mapper 150, via the mapper API 152, transmits a request for the missing data corresponding to the required parameter PR4 to the customer inputs engine 120, which then transmits a supplemental request 125 for the missing data corresponding to the required parameter PR4 via the user interface 121 of the customer inputs engine 120.

A next response 126 including supplemental data 127 is then sent via the user interface 121 in response to the supplemental request 125 and stored in the item record 171 in stored data 170 along with, and associated with, the item code 172, the corresponding preliminary data 124, the classification code 136 and the required parameters 164 for the item in the record 171 of the item.

Such supplemental requests may be sent and corresponding next responses including the supplemental data 127 may be received for each required parameter for that item for which there had not been any preliminary data mapped into it. In some embodiments, a single request may be sent for missing data for all the required parameters for which there had not been any preliminary data mapped for that item and one or more responses including the supplemental data 127 may be received in response to such a request, which may then be stored in the corresponding record 171 of the item. The stored data 170 may include multiple item records for a plurality of different items. The stored data 170 may also include multiple item records for a plurality of different customers each having a plurality of different item records for different items of that customer. Each record 171 may be identified with a unique item code 172 associated with item corresponding to the particular record 171.

It will be recognized that, in the event where the missing information involves a government agency, e.g. for clearing a regulatory requirement, in some embodiments such a response with supplemental data is not be sent by a user; rather, such agencies can be looked up automatically, along with any log-in data, such as a network address, which permit automated filing with such agencies. Such may be stored in connection with the item, for implementing automatic filings with these agencies, and so on.

FIG. 7D shows a state 706 of the system 100 of FIG. 1 with the supplemental data 127 stored in the item record 171 in stored data 170 along with, and associated with, the item code 172, the corresponding preliminary data 124, the classification code 136 and the required parameters 164 for the item in the record 171 of the item. In some embodiments, such preliminary data 124 and/or supplemental data 127 may be used to create or update record 171. Also, although the preliminary data 124 and supplemental data 127 is shown in the present example as being obtained from customer inputs via a user interface 121, some or all of such preliminary data 124 and/or supplemental data 127 may be obtained via automated smart systems that extract such data from other stored data of various other systems and locations.

As shown in the operation 708 illustrated in FIG. 7E, the CE API 149 may then receive the request 128 to compute the tax for a transaction involving the item associated with record 171. The request 128 may have request data 144 including the item code 172 identifying the item. The computation engine 147 receives the item code 172 via the CE API 149 and uses the item code 172 to identify the record 171 of the item by transmitting a request for such data to the stored data 170 using the item code 172.

As shown in the operation 710 illustrated in FIG. 7F, in response to the request, the computation engine 147 receives items stored in the record 171 of the item, for example, the mapped preliminary data 124 and the mapped supplemental data 127 for the item and updated tax rules and/or formulas (e.g., such as those shown in FIG. 4) stored in the content database 160 for computing tax for the item based on the mapped preliminary data 124 and on the mapped supplemental data 127 stored in the record 171 for the item.

Figure 7G:
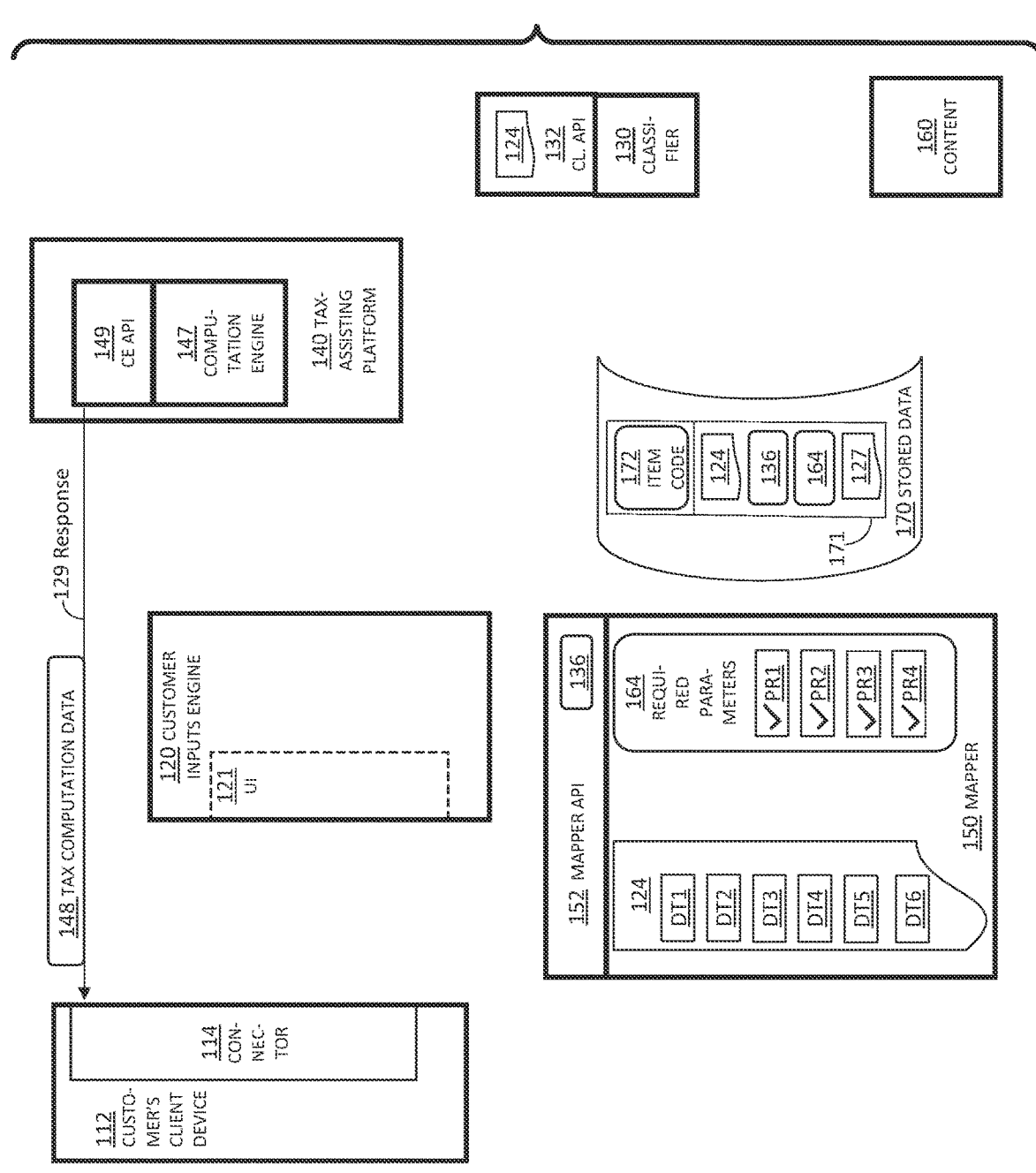

As shown in the operation 712 illustrated in FIG. 7G, the computation engine 147 then computes, responsive to the request 128 to compute the tax, the tax for the transaction involving the item based on the mapped preliminary data 124 and on the mapped supplemental data 127 stored in the record 171 and also the updated tax rules and/or formulas (e.g., such as those shown in FIG. 4) stored in the content database 160 for computing tax for the item. In particular, the elements of record 171, such as the corresponding preliminary data 124, the classification code 136 and the required parameters 164 for the item in the record 171 of the item as well as the updated tax rules and/or formulas, are used by computation engine 147 to produce a computation 148. The computation 148 may be a computation of tax in response to the request 128 having request data including the item code 172 identifying the item. The computation engine 147 then transmits to the customer's client device 112, via the CE API 149 and the connector 114 of the customer's client device 112, the response 129 including the tax computation 148. For example, the tax computation 148 may be of an import duty calculated based on the import rules for the country the item is being shipped from and the export rules of the country the item is being shipped to and other required parameters for that item, such as the weight of the item or other required parameters obtained by the computation engine 147.

Figure 8:
FIG. 8 is a diagram showing a sequence of operations for assembling parameters to compute taxes for cross-border sales, according to various embodiments of the present disclosure.

FIG. 8 is a timing diagram 800 showing a sequence of operations for assembling parameters to compute taxes for cross-border sales, according to various embodiments of the present disclosure.

At operation 1, the customer may enter item data via the customer's client device 112, such as preliminary data regarding the item and the transaction (e.g., item description, ship from location and ship to location, etc.). At operation 2, the customer inputs engine 120 creates classification code hints based on such preliminary data, and at operation 3 sends a request including such hints to the classifier 130. These hints may be derived by the customer inputs engine 120 from the preliminary data entered and may be related to attributes of the item related to a possible classification of the item. For example, if the item description entered as the item data indicates jewelry, this made be used to create a hint that the classification of the item may be related to jewelry. Such a hint may be one or more words, and/or digits in terms of a partial or a complete classification code.

The classifier 130 may then determine the classification code for the item based on the classification code hints and, at operation 4, the mapper 150 receives the classification code from the classifier 130. At operation 5, the mapper 150 requests the parameters required for computing the tax for the item by sending a request to the content database 160, which stores such data. In response, the mapper 150 receives the required parameters at operation 6.

At operation 7, the mapper maps the preliminary data into the required parameters and determines whether there are any required parameters for which there has not been any preliminary data mapped into them. If the mapper 150 determines there are required parameters for which there has not been any preliminary data mapped into them, this is identified by the mapper 150 as missing data and at operation 8, a resulting request for the missing data is transmitted to the customer's client device 112. In response to the request, at operation 9 the customer inputs engine 120 receives the missing data, such as via the user interface 121 of the customer inputs engine 120. At operation 10, the customer inputs engine 120 stores the parameter values of preliminary data and the required parameter values of the missing data along with the item code identifying the item, which may be used to compute the tax for the item.

Figure 9A:
FIGS. 9A-9C are example graphical user interfaces showing a sequence of interactive graphical user interface screens presented to a user to obtain supplemental data from a user for assembling parameters to compute taxes for cross-border sales, according to various embodiments of the present disclosure.
Figure 9B:
Figure 9C:

FIGS. 9A-9C are example graphical user interfaces showing a sequence of interactive graphical user interface screens 900, 902 and 904 presented to a user to obtain supplemental data from a user for assembling parameters to compute taxes for cross-border sales, according to various embodiments of the present disclosure. For example, such user interface screen may be part of user interface 121 of the customer inputs engine 120 and presented on, or caused to be presented on, the customer's client device 112 of FIG. 1 in communication with the customer inputs engine 120.

Shown on the user interface screen 900 of FIG. 9A, are labels of preliminary parameters 914 for an item for which a user may enter values in corresponding entry fields 916 for each preliminary parameter. Different preliminary parameters and corresponding entry fields may be generated and presented for different types, categories and/or classifications of items. In some embodiments, the entry fields 916 may include interactive drop-down menus or other interactive user interface elements providing a menu of possible values corresponding to the respective parameter. In the present example, the user has entered "Jewelry" for the "Category" parameter, "Chain" for the "Item" parameter, "USA" for the "Ship From" parameter, "France" for the "Ship To" parameter, "Gold" for the "Main element" parameter and "14K" for the "Carats" parameter. Also, shown is a button 906 which the user may select to create the item record with the data values entered for the preliminary parameters 914 in the corresponding entry fields 916.

Shown in FIG. 9B is an example user interface screen 902 presented as a result of the user selecting the button 906 to create the item record with the data values entered for the preliminary parameters 914 in the corresponding entry fields 916. After the user selected the button 906 to create the item record with the data values entered for the preliminary parameters 914 in the corresponding entry fields 916, the system 100 recognized, based on mapping the data values entered for the preliminary parameters 914 in the corresponding entry fields 916 into required parameters, there is a missing required parameter needed to compute tax for that particular item being shipped from USA to France. In response, the system 100 presents on the user interface screen 902 a prompt 908 for the user to enter the missing data for the required parameter. In the present example, the missing required parameter is the weight of the item in grams. Shown is a label for the missing required parameter 910 and a corresponding an entry field 912 in which the user may enter the required data for the missing required parameter 910.

Shown in FIG. 9C is an example user interface screen 904 presented as a result of the user entering in the entry field 912 the required data for the missing required parameter 910, which is, in the present example, 50 g. Presented on the user interface screen 904 is also a new button 918 which the user may select to create the item record with the data values entered for the preliminary parameters 914 in the corresponding entry fields 916 along with the data value entered in the entry filed 912 for the missing parameter (the weight in grams of the item). This data record for the item may then be used by the system to compute the correct tax for the gold chain being shipped from USA to France.

FIGS. 10A-10D are example user interface portions 1000, 1002, 1004 and 1006, respectively of graphical user interfaces showing a sequence of interactive graphical user interface screens presented to a user for facilitating classifying products and presenting required parameters in a process of assembling parameters to compute taxes for cross-border sales, according to various embodiments of the present disclosure.

The user interface portion 1000 of the user interface screen includes three sections including the item setup section 1008, the item classification section 1010 and the item parameters section 1012. The user may enter the item code, item code type, item group and/or the item description in the item setup section 1008. Such data entered in the item setup section 1008 (e.g., the item code and/or the item description) may be used by the system 100 to classify the item in order to determine required parameters for the item needed to compute tax for that item. For example, after entering the item code in the item setup section 1008, the user may select the save button 1014 to obtain classification codes for various corresponding tax systems shown in the item classification section 1010.

Figure 10A:
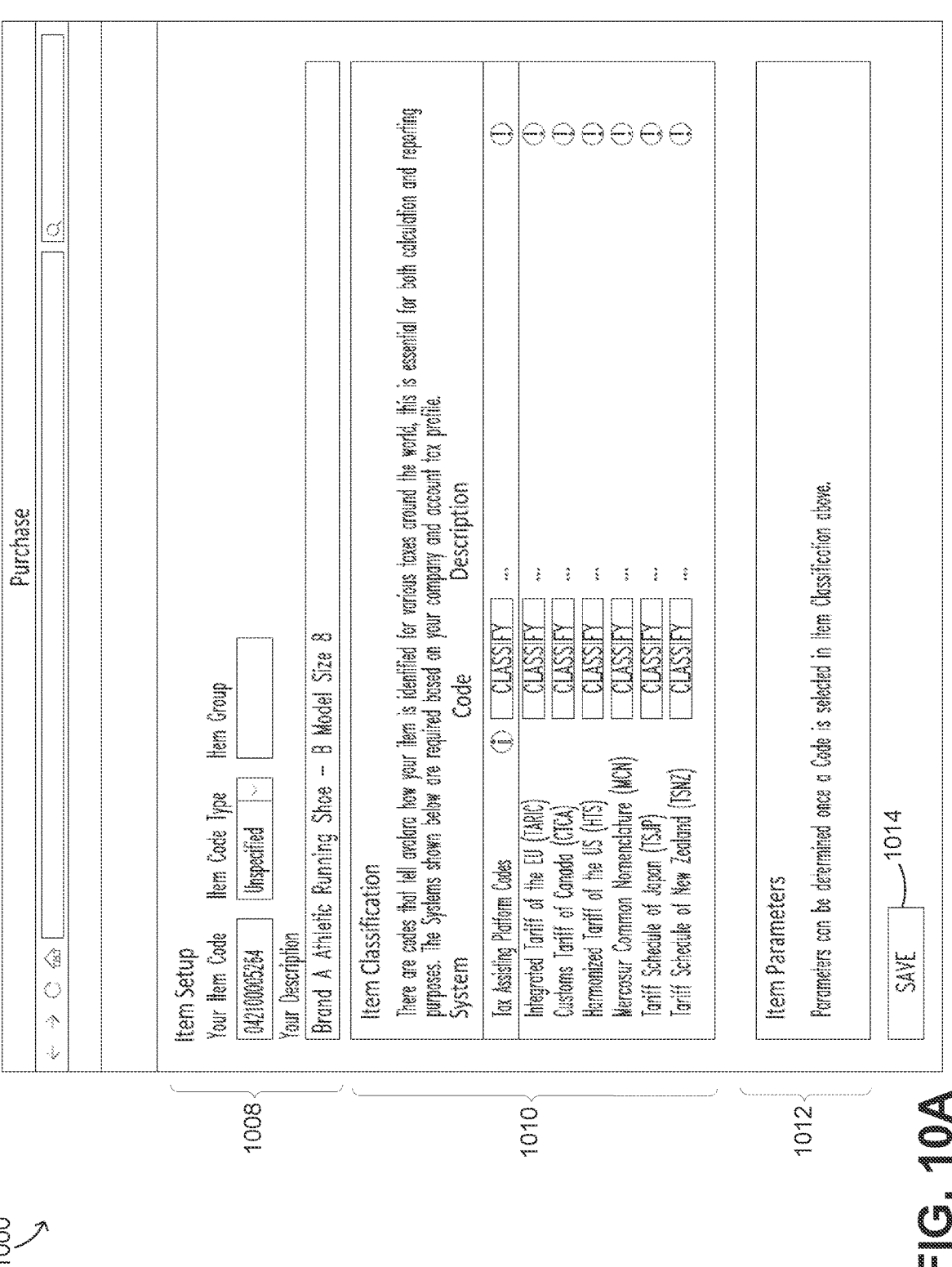
FIGS. 10A-10D are example portions of graphical user interfaces showing a sequence of interactive graphical user interface screens presented to a user for facilitating classifying products and presenting required parameters in a process of assembling parameters to compute taxes for cross-border sales, according to various embodiments of the present disclosure.
Figure 10B:
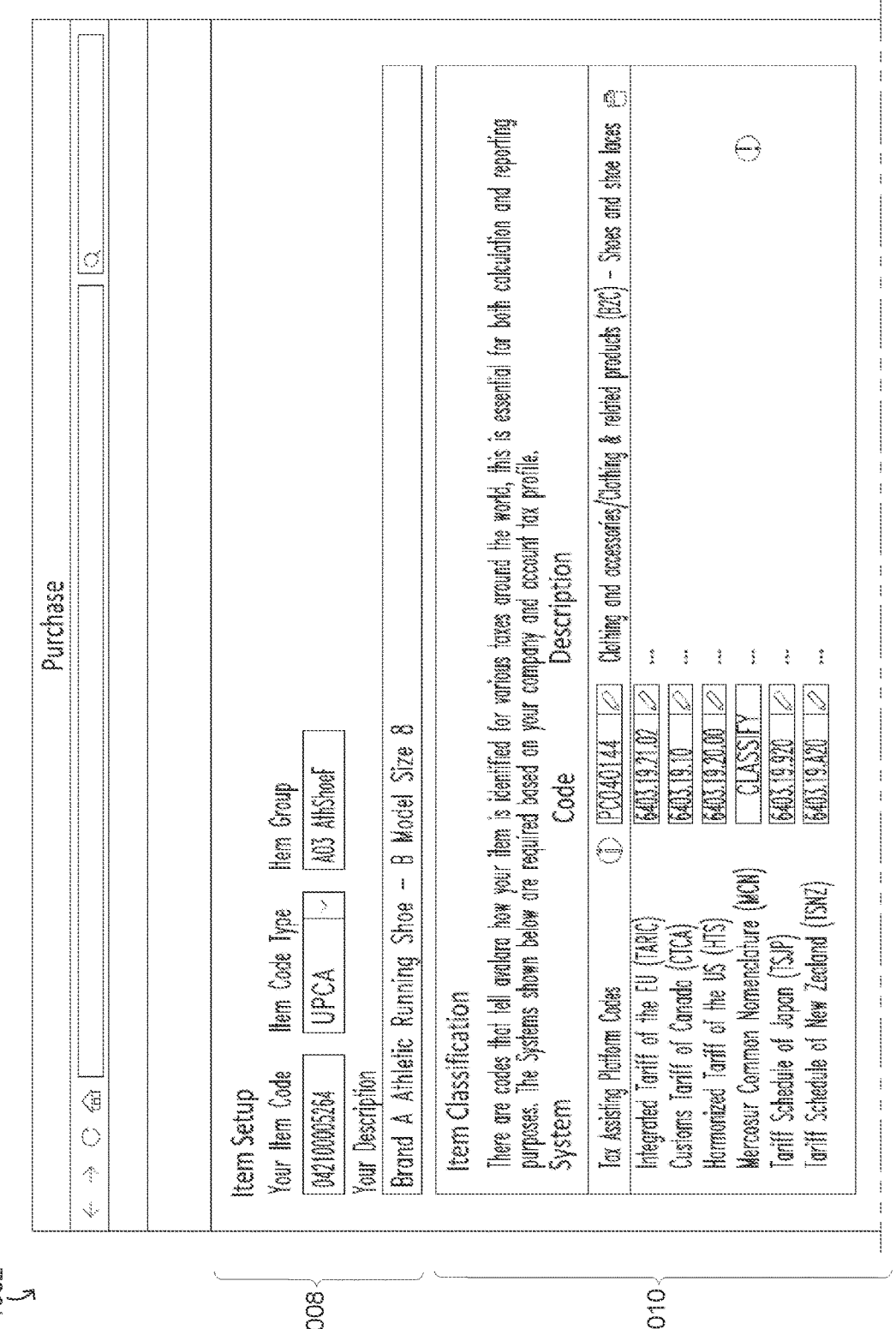

Shown in FIG. 10B, is user portion 1002 that may be presented as a result of the user entering the item code in the item setup section 1008 and selecting the save button 1014 shown in FIG. 10A. In response to the user entering the item code in the item setup section 1008 and selecting the save button 1014 shown in FIG. 10A, the classification codes for various relevant corresponding tax systems are obtained by the system 100 and displayed in the item classification section 1010. The user may then select from the item classification section 1010 displayed classification codes of corresponding tax systems for which the user would like the required parameters presented. These are the parameters required for computing tax for the item in tax systems corresponding to the selected classification codes.

Figure 10C:
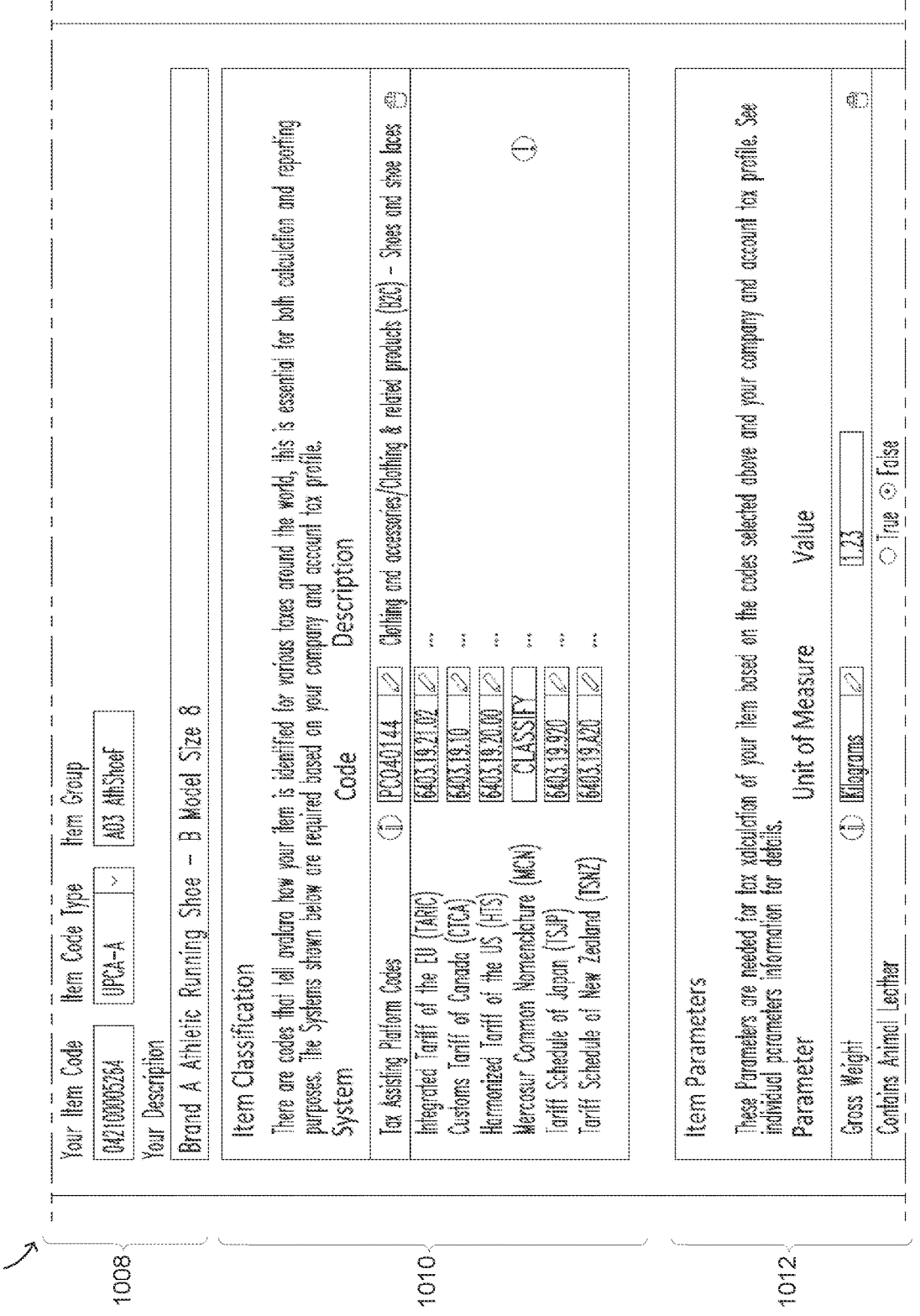
Figure 10D:
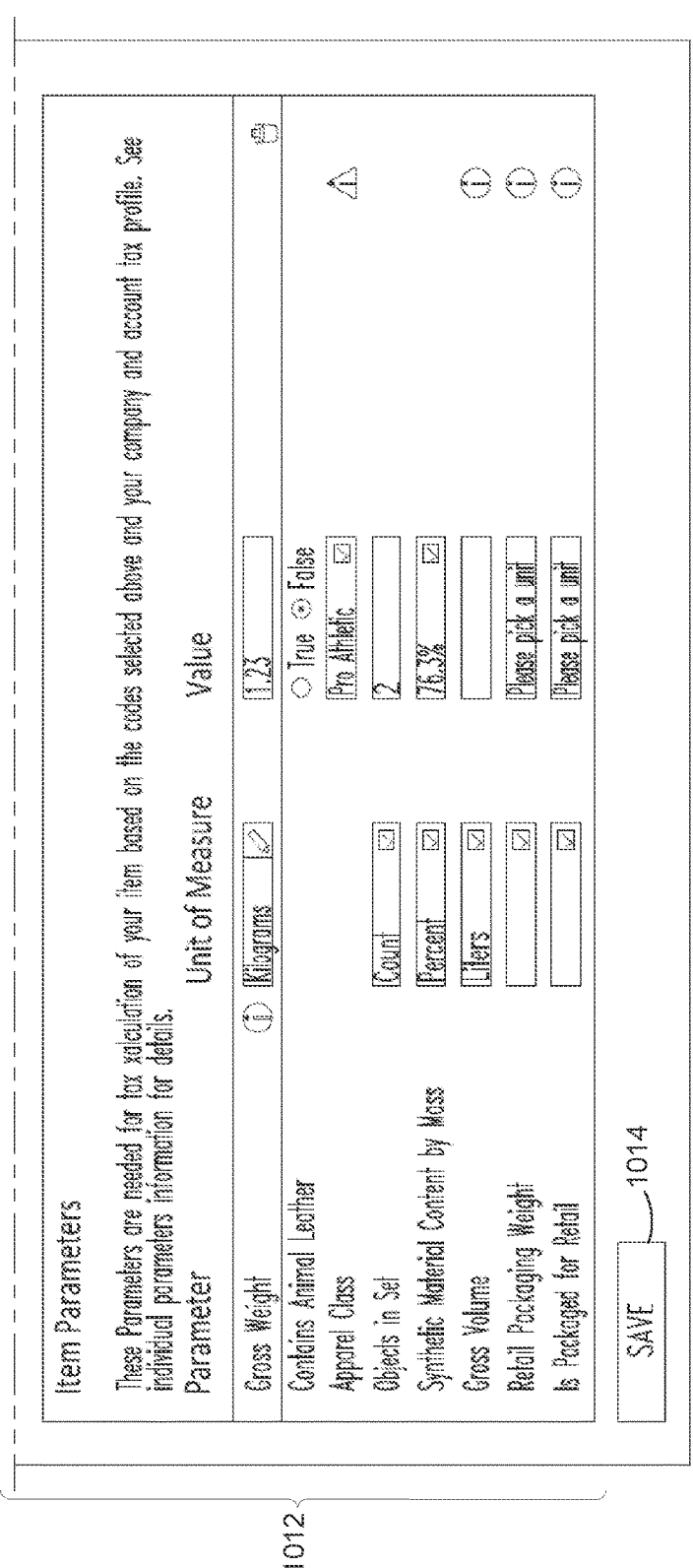

For example, as shown in FIG. 10B, the user has selected the classification code for the tax assisting platform tax system in the item classification section 1010. As shown in FIGS. 10C and 10D, in response to the selecting the classification code for the tax assisting platform tax system in the item classification section 1010, the required parameters for computing tax for that item according to that selected classification code are presented in the item parameters section 1012. In the present example, these required parameters presented in the item parameters section 1012 include the gross weight, whether the item contains animal leather, apparel class, objects in set, synthetic material content by mass, gross volume, retail packaging weight and whether the package is for retail. The user may them enter the values for such required parameters in corresponding entry fields in the item parameters section 1012. The user may then select the save button 1014 to save such data entered for the required parameters along with the classification code and other preliminary data previously entered for the item in the corresponding item record. The data entered for the required parameters along with the classification code and other preliminary data previously entered for the item in the item record may then be used by the system 100 to compute the tax for that item based on the corresponding classification code displayed by the system 100 and selected by the user in the item classification section 1010.

Figure 11:
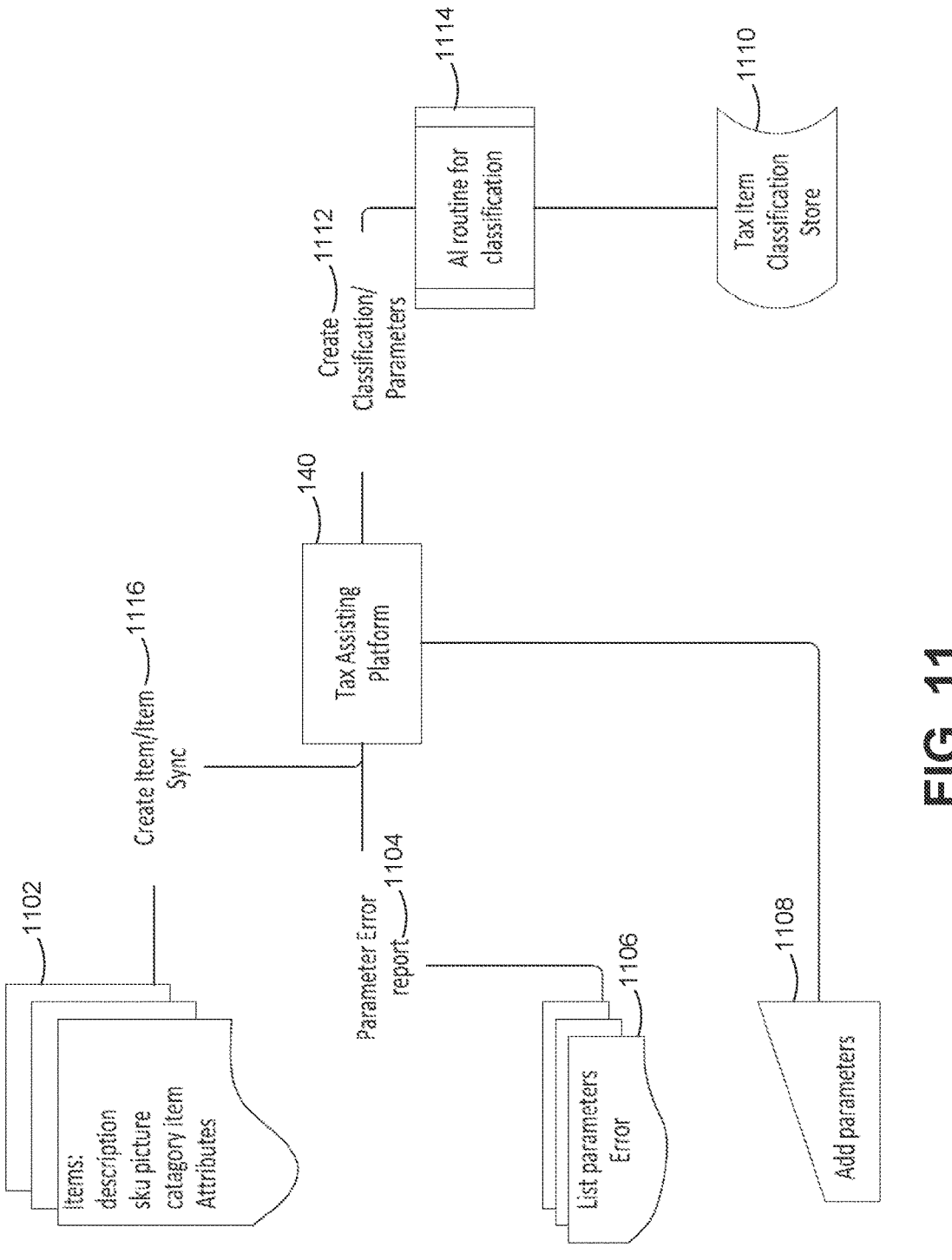
FIG. 11 is a diagram showing an example workflow of the tax assisting platform in assembling parameters to compute taxes for cross-border sales, according to various embodiments of the present disclosure.

FIG. 11 is a diagram showing an example workflow 1100 of the tax assisting platform in assembling parameters to compute taxes for cross-border sales, according to various embodiments of the present disclosure.

In the present example, the tax assisting platform 140 creates an item record 1116 via user input of data 1102 to be included in the item record and/or via an item synchronization process with data of another system that already includes such item data 1102. The tax assisting platform 140 then creates a classification of the item by determining a classification code and determines needed parameters 1112 for computing the tax for the item based on the preliminary data existing in the item record 1102 and the classification code. The classification may be performed by an artificial intelligence routine 1114 based on hints gleaned from the preliminary data existing in the item record 1102. The classification may also be stored in the tax item classification store 1110. The tax assisting platform 140 then determines which of the needed parameters 1112 for computing the tax for the item are missing from the preliminary data and generates a parameter error report 1104 including a list of missing required parameters 1106. The tax assisting platform 140 may then add such missing parameters (1108) via prompts to the user or other systems to supply the missing data in order to compute the tax for the particular item.

Figure 12:
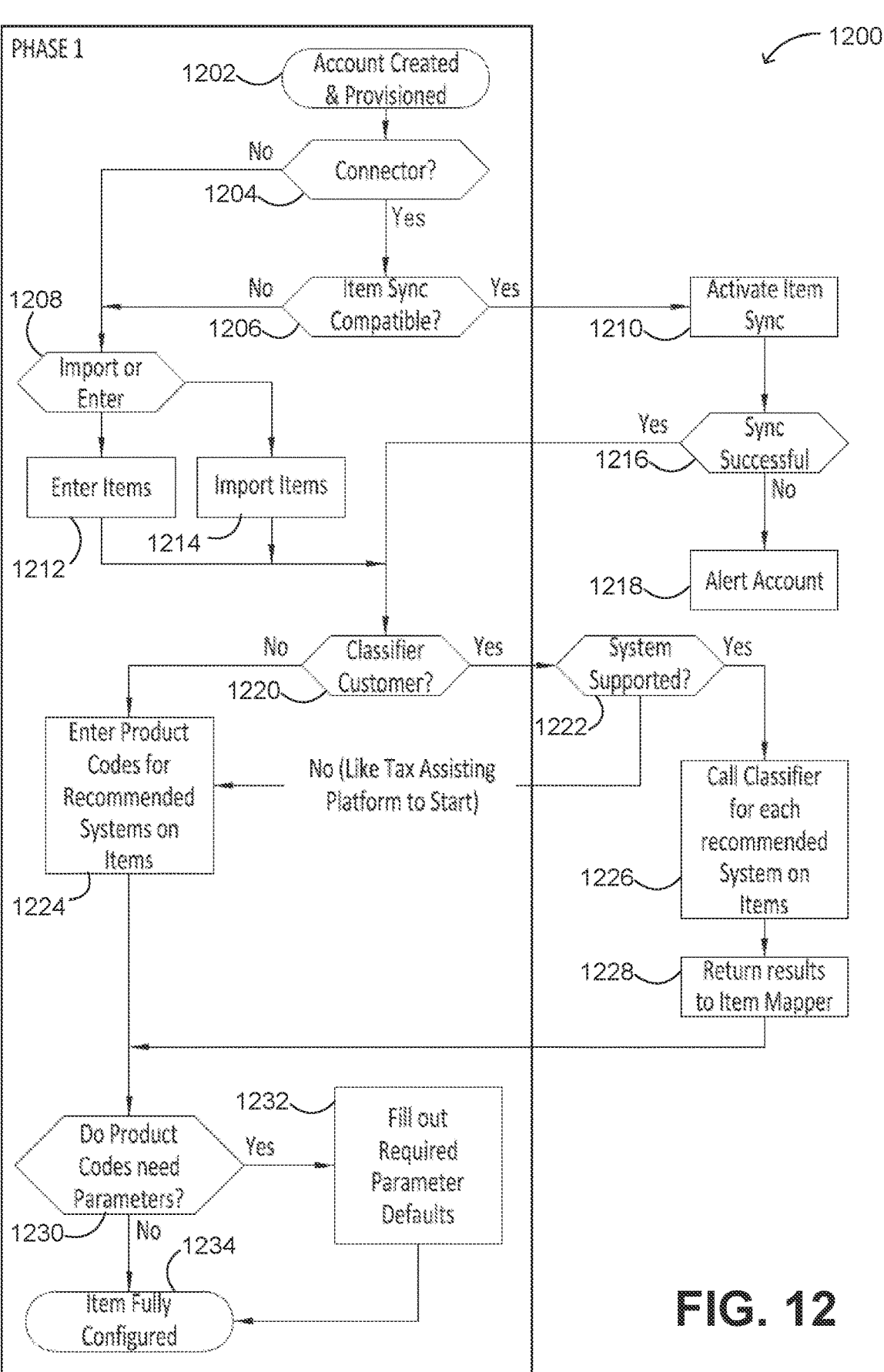
FIG. 12 is a flow diagram showing an example process for setting up a system for assembling parameters to compute taxes for cross-border sales, according to various embodiments of the present disclosure.

FIG. 12 is a flow diagram showing an example process 1200 for setting up a system for assembling parameters to compute taxes for cross-border sales, according to various embodiments of the present disclosure.

At 1202, a system (e.g., the system 100 of FIG. 1) creates and provisions an account for tax assistance services for a customer regarding one or more items associated with the account. For example, among other services, the account may be for the service of computing tax in cross-border sales of the one or more items by the customer.

At 1202, the system 100 determines whether a connector (e.g., connector 114 of FIG. 1) exists that is associated with the account.

If the system 100 determines there is a connector associated with the account, then at 1206, the system 100 determines whether the item associated with the account is synchronization (sync) compatible.

If the system 100 determines the item is sync compatible, then at 1210 the system 100 activates item synchronization, which may result in obtaining preliminary data for the item associated with the account. For example, the system 100 may sync data with one or more other systems which store preliminary data regarding the item. Also, item synchronization may result in data associated with the account being synced or otherwise provided to one or more other systems and/or accounts associated with the item and/or the customer associated with the account.

At 1216 the system 100 determines whether the sync was successful.

If the system 110 determines the sync was not successful, the system 100 at 1218 alerts the account.

If the system 110 determines the sync was successful, the system 100 proceeds to 1220.

If at 1204, the system 100 determines there is not a connector associated with the account, the system 100 proceeds to 1208. Also, if at 1206 the system 100 determines the item is not sync compatible the system 100 also proceeds to 1208.

At 1208, the system 100 determines whether to import data regarding the item and/or have data regarding the item entered by the user and, based on the determination, has data items entered at 1212 and imports data items at 1214 into a data record (e.g., record 171) of the item associated with account. This may result in preliminary data regarding the item stored in the data record (e.g., record 171) of the item associated with account. For example, such preliminary data may include an item code, an item description and a ship to and ship from location for the item.

At 1220, the system 100 determines whether the items of the customer associated with the account are to be classified by the classifier (e.g., classifier 130). If it is determined that the items of the customer associated with the account are to be classified by the classifier (e.g., classifier 130), the system 100 proceeds to 1222.

At 1222, the system 100 determines whether the recommended tax systems for which the classification is being made are supported. Various examples of such tax systems are presented under the "System" heading in the item classification section 1010 shown in FIGS. 10A, 10B and 10C. If it is determined that the recommended tax systems for which the classification is being made are supported, the system 100 invokes or calls the classifier (e.g., classifier 130) for each such recommended tax system to classify each of such items, for examples based on the preliminary data of the item.

At 1228, the system 100 returns the classification results (e.g., product codes or classification codes) of the items to the item mapper (e.g., the mapper 150) and the system proceeds to 1230.

If it is determined at 1220 that the items of the customer associated with the account are not to be classified by the classifier (e.g., classifier 130) or if it is determined at 1222 that the recommended tax systems for which the classification is being made are supported, the system 100 proceeds to 1224.

At 1224, the system 100 receives entered product codes (i.e., classification codes) for recommended tax systems for the items associated with the account. For example, such classification codes may be entered in the item classification section 1010 of the user interface portion 1004 shown in FIGS. 10A, 10B and 10C.

At 1230, the system 100 determines, based on the preliminary data and product codes (i.e., classification codes) of the items associated with the account, whether there are any missing parameters required for computing tax for the items having such product codes. In some embodiments, the system 100 may use the preliminary data, such as "ship from" and "ship to" locations for the item, to learn what the required parameters are for items having such product codes in the content database 160 of FIG. 1. In one example, the system 100 may determine whether such parameters are missing prom the preliminary data by causing the mapper 150 to map the received preliminary data into the learned required parameters and determining whether there are any required parameters for which there has not been any preliminary data mapped into them. If it is determined there are any missing parameters required for computing tax for the items having such product codes, then the system proceeds to 1232.

At 1232, the system 100 provides such missing parameters and fills out the required parameter with parameter default values that may be edited by the customer. For example, such required parameter defaults may be presented in the item parameters section 1012 on user interface portions 1004 and 1006 shown in FIGS. 10C and 10D respectively. The system then proceeds to 1234. Also, if it is determined there are not any missing parameters required for computing tax for the items having such product codes, then the system 100 proceeds to 1234.

At 1234, the process for setting up the system for assembling parameters to compute taxes for cross-border sales is completed and the item associated with the account is fully configured.

Figure 13:
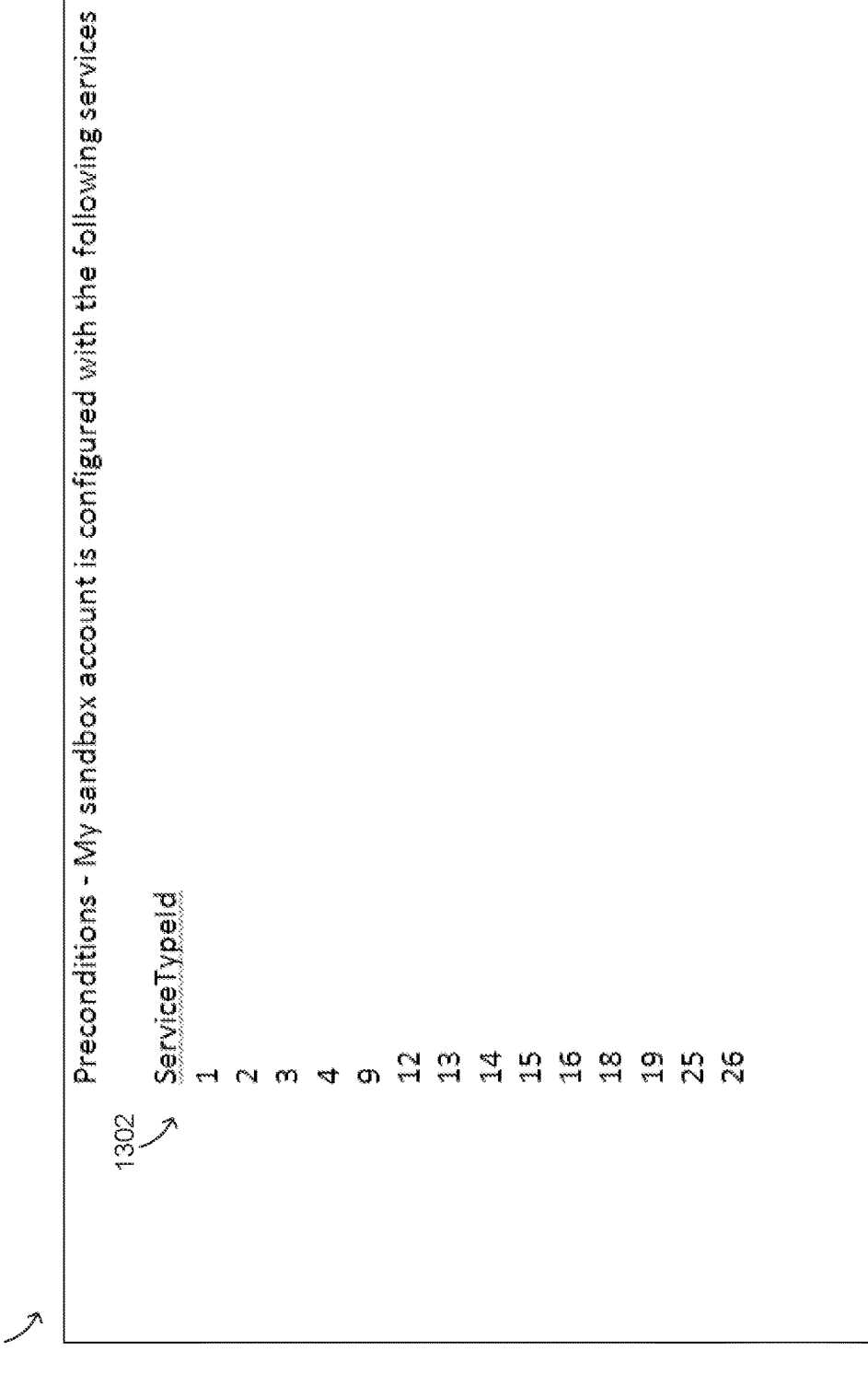
FIG. 13 is an example user interface for configuring a customer in a system for assembling parameters to compute taxes for cross-border sales, according to various embodiments of the present disclosure.

FIG. 13 is an example user interface 1300 for configuring a customer in a system for assembling parameters to compute taxes for cross-border sales, according to various embodiments of the present disclosure. Shown in the user interface 1300 are selectable preconditions indicating with which services the account is to be configured. For example, shown is a list 1302 of services identified by "ServiceTypeId" from which the user may select to configure the account and may be available to the customer after the account is configured.

FIG. 14 is an example user interface 1400 listing tax service types, and where optionally each tax type service can be turned ON/OFF in a system for assembling parameters to compute taxes for cross-border sales, according to various embodiments of the present disclosure. Shown on the user interface 1400 is a selectable list 1402 of tax service types with a description of each tax service type. The user may select particular tax services from the list 1402 associated with the user's account to turn on or off such services.

FIG. 15 is an example code sequence 1500 for calling the Mapper Application Programming Interface (API) API 152 initially, according to various embodiments of the present disclosure. The code sequence 1500 includes example procedures (procedures 1 through 5) that may be executed by the system 100 for calling the mapper API 152, such as to enable the mapper 150 to perform mapping of the preliminary data into the required parameters, as described herein.

Figure 16:
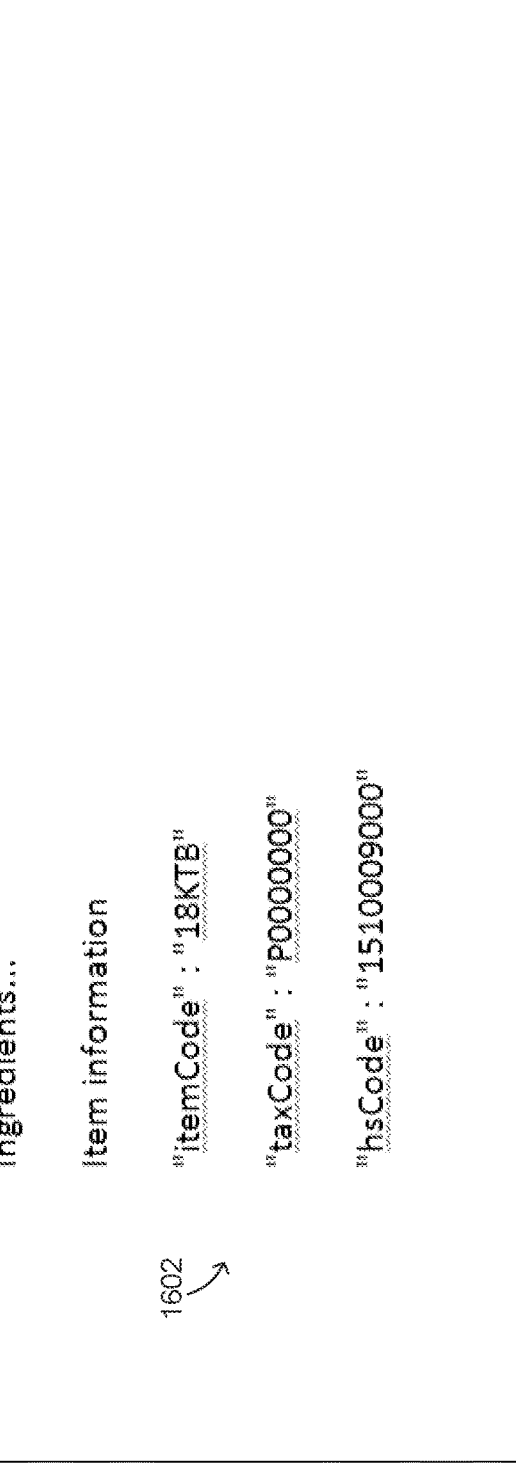
FIG. 16 is a diagram of example elements of an example a user interface useful in facilitating operation of the example code sequence for calling the Mapper API, according to various embodiments of the present disclosure.

FIG. 16 is a diagram of example elements of an example a user interface 1600 useful in facilitating operation of the example code sequence for calling the Mapper API, according to various embodiments of the present disclosure. For example, the user interface 1600 provides data entry fields 1602 in which data may be entered that is used by the mapper API 152 to enable the mapper 150 to perform mapping of the preliminary data into the required parameters. For example, such data may include values for parameters such as "itemCode", "taxCode" and "hsCode".

As used herein, a "component" may refer to a device, physical entity or logic having boundaries defined by function or subroutine calls, branch points, application programming interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The claimed invention is:

1. A method of using a computer system, including:

causing the computer system to store preliminary data about an item;

transmitting a request to the computer system, thereby causing the computer system to:

invoke a customer inputs engine to send to a classifier application programming interface (API) and a mapper API the received preliminary data;

then, in response to the receiving the preliminary data, cause a classifier API to invoke a classifier of the computer system to look up, based on the preliminary data, a classification code for the item;

then, in response to the looking up the classification code, cause the classifier to return the looked-up classification code to the mapper API via the classifier API;

then, in response to the classifier returning the looked-up classification code to the mapper API via the classifier API, cause a mapper to store the looked-up classification code in a digital item record for the item in stored data;

then, in response to the mapper storing the looked-up classification code in the digital item record, cause the mapper to transmit the looked-up classification code for the item to a content database via the mapper API;

then, in response to the mapper transmitting the looked-up classification code for the item to a content database via the mapper API, cause the mapper to generate, via the mapper API, and based on the looked-up classification code, a parameter request for parameters required for computing a data value associated with providing the item in a particular state;

then, in response to the mapper generating the parameter request, input, responsive to the generated parameter request, parameters required for computing the data value;

then, in response to the inputting, responsive to the generated parameter request, parameters required for computing the data value, map the stored preliminary data into the required parameters;

determine, after the mapping, that a certain one of the required parameters has not had any of the preliminary data mapped into the certain one of the required parameters; and cause the customer inputs engine to transmit, based on the determination, a supplemental request for supplemental data for the certain parameter, wherein the supplemental request is for missing data for a plurality of required parameters for which there had not been any preliminary data mapped for the item;

the method further including:

receiving, by the computer system, the supplemental request;

transmitting, to the computer system and responsive to the supplemental request, supplemental data over a computer network from remote electronic automated smart systems that extract missing data from other stored data of various other remote systems and locations, wherein the supplemental data comprises a plurality of responses that are electronically received in response to the transmitted supplemental request, thereby causing the computer system to further:

receive the transmitted supplemental data; and map the received supplemental data into the certain parameter;

the method further including:

then transmitting to the computer system a request to compute the data value, thereby causing the computer system to:

compute the data value based on the mapped preliminary data and on the mapped supplemental data; and transmit a response encoding the computed data value.

2. The method of claim 1, in which:

the classification code is looked up also based on the particular state.

3. The method of claim 1, in which:

the classification code is a harmonized system (HS) code.

4. The method of claim 1, in which the computer system is further caused to:

form, based on the stored preliminary data, a classification code request; and receive, responsive to the classification code request, a classification code response, and in which: the classification code is looked up from the classification code response.

5. The method of claim 4, in which:

the classification code request is formed as hints from the received preliminary data.

6. The method of claim 4, in which:

the classification code request is formed as hints from the received preliminary data.

7. The method of claim 1, in which the computer system is further caused to:

transmit the generated parameter request to a first computer system different from the computer system; and in which: the required parameters are inputted by being received from a second computer system different from the computer system.

8. The method of claim 7, in which:

the first computer system is the same as the second computer system.

9. The system of claim 1, in which:

the supplemental data includes log-in information about a U.S. government agency.

10. The method of claim 1, in which the computer system is further caused to:

determine, after the mapping, that an additional one of the required parameters has not had any data mapped into the additional one of the required parameters;

transmit, based on the determination, an additional request for supplemental data for the additional parameter;

receive, responsive to the transmitted additional request, additional data; and map the received additional data into the additional parameter, and in which: the data value is computed based also on the mapped additional data.

11. A system, comprising:

at least one processor; and a memory coupled to the at least one processor, the memory storing instructions that, when executed by the at least one processor, cause the at least one processor to perform operations comprising:

transmitting a request to the computer system, thereby causing the computer system to:

invoke a customer inputs engine to send to a classifier application programming interface (API) and a mapper API the received preliminary data;

then, in response to the receiving the preliminary data, cause a classifier API to invoke a classifier of the computer system to look up, based on the preliminary data, a classification code for the item;

then, in response to the looking up the classification code, cause the classifier to return the looked-up classification code to the mapper API via the classifier API;

then, in response to the classifier returning the looked-up classification code to the mapper API via the classifier API, cause a mapper to store the looked-up classification code in a digital item record for the item in stored data;

then, in response to the mapper storing the looked-up classification code in the digital item record, cause the mapper to transmit the looked-up classification code for the item to a content database via the mapper API;

then, in response to the mapper transmitting the looked-up classification code for the item to a content database via the mapper API, cause the mapper to generate, via the mapper API, and based on the looked-up classification code, a parameter request for parameters required for computing a data value associated with providing the item in the particular state;

then, in response to the mapper generating the parameter request, input, responsive to the generated parameter request, parameters required for computing the data value;

then, in response to the inputting, responsive to the generated parameter request, parameters required for computing the data value, map the stored preliminary data into the required parameters;

determine, after the mapping, that a certain one of the required parameters has not had any of the preliminary data mapped into the certain one of the required parameters; and cause the customer inputs engine to transmit, based on the determination, a supplemental request for supplemental data for the certain parameter, wherein the supplemental request is for missing data for a plurality of required parameters for which there had not been any preliminary data mapped for the item;

receiving, by the computer system, the supplemental request;

transmitting, to the computer system and responsive to the supplemental request, supplemental data over a computer network from remote electronic automated smart systems that extract missing data from other stored data of various other remote systems and locations, wherein the supplemental data comprises a plurality of responses that are electronically received in response to the transmitted supplemental request, thereby causing the computer system to further:

receive the transmitted supplemental data; and map the received supplemental data into the certain parameter; and then transmitting to the computer system a request to compute the data value, thereby causing the computer system to:

compute the data value based on the mapped preliminary data and on the mapped supplemental data; and transmit a response encoding the computed data value.

12. The system of claim 11, in which:

the classification code is looked up also based on the particular state.

13. The system of claim 11, in which:

the classification code is a harmonized system (HS) code.

14. The system of claim 11, wherein the instructions, when executed by the at least one processor, further cause the at least one processor to:

form, based on the stored preliminary data, a classification code request; and receive, responsive to the classification code request, a classification code response, and in which: the classification code is looked up from the classification code response.

15. The system of claim 14, in which:

the classification code request is formed as hints from the received preliminary data.

16. The system of claim 11 wherein the instructions, when executed by the at least one processor, further cause the at least one processor to:

transmit the generated parameter request to a first computer system different from the computer system; and in which: the required parameters are inputted by being received from a second computer system different from the computer system.

17. The system of claim 16, in which:

the first computer system is the same as the second computer system.

18. The system of claim 11, in which:

the supplemental data includes log-in information about a U.S. government agency.

19. The system of claim 11 wherein the instructions, when executed by the at least one processor, further cause the at least one processor to:

determine, after the mapping, that an additional one of the required parameters has not had any data mapped into the additional one of the required parameters;

transmit, based on the determination, an additional request for supplemental data for the additional parameter;

receive, responsive to the transmitted additional request, additional data; and map the received additional data into the additional parameter, and in which: the data value is computed based also on the mapped additional data.

20. A non-transitory computer-readable storage medium having computer-executable instructions stored thereon that, when executed by at least one processor, cause the at least one processor to perform operations comprising:

transmitting a request to the computer system, thereby causing the computer system to:

invoke a customer inputs engine to send to a classifier application programming interface (API) and a mapper API the received preliminary data;

then, in response to the receiving the preliminary data, cause a classifier API to invoke a classifier of the computer system to look up, based on the received preliminary data, a classification code for the item;

then, in response to the looking up the classification code, cause the classifier to return the looked-up classification code to the mapper API via the classifier API;

then, in response to the classifier returning the looked-up classification code to the mapper API via the classifier API, cause a mapper to store the looked-up classification code in a digital item record for the item in stored data;

then, in response to the mapper storing the looked-up classification code in the digital item record, cause the mapper to transmit the looked-up classification code for the item to a content database via the mapper API;

then, in response to the mapper transmitting the looked-up classification code for the item to a content database via the mapper API, cause the mapper to generate, via the mapper API, and based on the looked-up classification code, a parameter request for parameters required for computing a data value associated with providing the item in the particular state;

then, in response to the mapper generating the parameter request, input, responsive to the generated parameter request, parameters required for computing the data value;

then, in response to the inputting, responsive to the generated parameter request, parameters required for computing the data value, map the stored preliminary data into the required parameters;

determine, after the mapping, that a certain one of the required parameters has not had any of the preliminary data mapped into the certain one of the required parameters; and cause the customer inputs engine to transmit, based on the determination, a supplemental request for supplemental data for the certain parameter, wherein the supplemental request is for missing data for a plurality of required parameters for which there had not been any preliminary data mapped for the item;

the method further including:

receiving, by the computer system, the supplemental request;

transmitting, to the computer system and responsive to the supplemental request, supplemental data over a computer network from remote electronic automated smart systems that extract missing data from other stored data of various other remote systems and locations, wherein the supplemental data comprises a plurality of responses that are electronically received in response to the transmitted supplemental request, thereby causing the computer system to further:

receive the transmitted supplemental data; and map the received supplemental data into the certain parameter;

the method further including:

then transmitting to the computer system a request to compute the data value, thereby causing the computer system to:

compute the data value based on the mapped preliminary data and on the mapped supplemental data; and transmit a response encoding the computed data value.

21. The non-transitory computer-readable storage medium of claim 20, in which:

the classification code is looked up also based on the particular state.

22. The non-transitory computer-readable storage medium of claim 20, in which:

the classification code is a harmonized system (HS) code.

23. The non-transitory computer-readable storage medium of claim 20, wherein the instructions, when executed by the at least one processor, further cause the at least one processor to:

form, based on the stored preliminary data, a classification code request; and receive, responsive to the classification code request, a classification code response, and in which: the classification code is looked up from the classification code response.

24. The non-transitory computer-readable storage medium of claim 23, in which:

the classification code request is formed as hints from the received preliminary data.

25. The non-transitory computer-readable storage medium of claim 23, in which:

the classification code request is formed as hints from the received preliminary data.

26. The non-transitory computer-readable storage medium of claim 20, wherein the instructions, when executed by the at least one processor, further cause the at least one processor to:

transmit the generated parameter request to a first computer system different from the computer system; and in which: the required parameters are inputted by being received from a second computer system different from the computer system.

27. The non-transitory computer-readable storage medium of claim 26, in which:

the first computer system is the same as the second computer system.

28. The non-transitory computer-readable storage medium of claim 20, in which:

the supplemental data includes log-in information about a U.S. government agency.

29. The non-transitory computer-readable storage medium of claim 20, wherein the instructions, when executed by the at least one processor, further cause the at least one processor to:

determine, after the mapping, that an additional one of the required parameters has not had any data mapped into the additional one of the required parameters;

transmit, based on the determination, an additional request for supplemental data for the additional parameter;

receive, responsive to the transmitted additional request, additional data; and map the received additional data into the additional parameter, and in which: the data value is computed based also on the mapped additional data.

* * * * *